(12) United States Patent
Su et al.

(10) Patent No.: US 12,249,146 B2
(45) Date of Patent: Mar. 11, 2025

(54) SYSTEMS AND METHODS FOR REDUCED RESOURCE UTILIZATION FOR EVENT MODELING

(71) Applicant: Verizon Patent and Licensing Inc., Basking Ridge, NJ (US)

(72) Inventors: Le Su, Edison, NJ (US); Lin Tang, Nutley, NJ (US); Krishna Pichumani Iyer, Basking Ridge, NJ (US); Yu Wan, Edgewater, NJ (US); Yiming Chen, Harrison, NJ (US); Wenyuan Lu, Raritan, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 530 days.

(21) Appl. No.: 17/673,292

(22) Filed: Feb. 16, 2022

(65) Prior Publication Data
US 2023/0260281 A1 Aug. 17, 2023

(51) Int. Cl.
*G06V 20/40* (2022.01)
*G06V 10/75* (2022.01)

(52) U.S. Cl.
CPC .......... *G06V 20/44* (2022.01); *G06V 10/755* (2022.01); *G06V 20/41* (2022.01); *G06V 20/46* (2022.01)

(58) Field of Classification Search
CPC ........ G06V 20/41; G06V 20/44; G06V 20/46; G06V 10/755; G06F 9/542; G06F 2201/86
See application file for complete search history.

(56) References Cited

U.S. PATENT DOCUMENTS

| | | | |
|---|---|---|---|
| 10,230,866 B1 * | 3/2019 | Townsend | H04N 1/2108 |
| 10,838,782 B2 * | 11/2020 | Liongosari | G06F 9/542 |
| 2016/0034712 A1 * | 2/2016 | Patton | G06Q 50/01 726/28 |
| 2020/0061465 A1 * | 2/2020 | Benedetto | A63F 13/55 |
| 2020/0250750 A1 * | 8/2020 | Remlinger | G06Q 40/04 |
| 2023/0222810 A1 * | 7/2023 | Kim | G06V 10/25 382/103 |

* cited by examiner

*Primary Examiner* — Daniel G Mariam

(57) ABSTRACT

A system described herein may provide a technique for using modeling techniques to identify events, trends, etc. in a set of data, such as streaming video or audio content. The system may perform lightweight pre-processing operations on a different set of data, such as object position data, to identify timeframes at which an event may potentially have occurred, and the modeling techniques may be performed at portions of the streaming content that correspond to such timeframes. The system may forgo performing such modeling techniques at other portions of the streaming content, thus conserving processing resources.

20 Claims, 18 Drawing Sheets

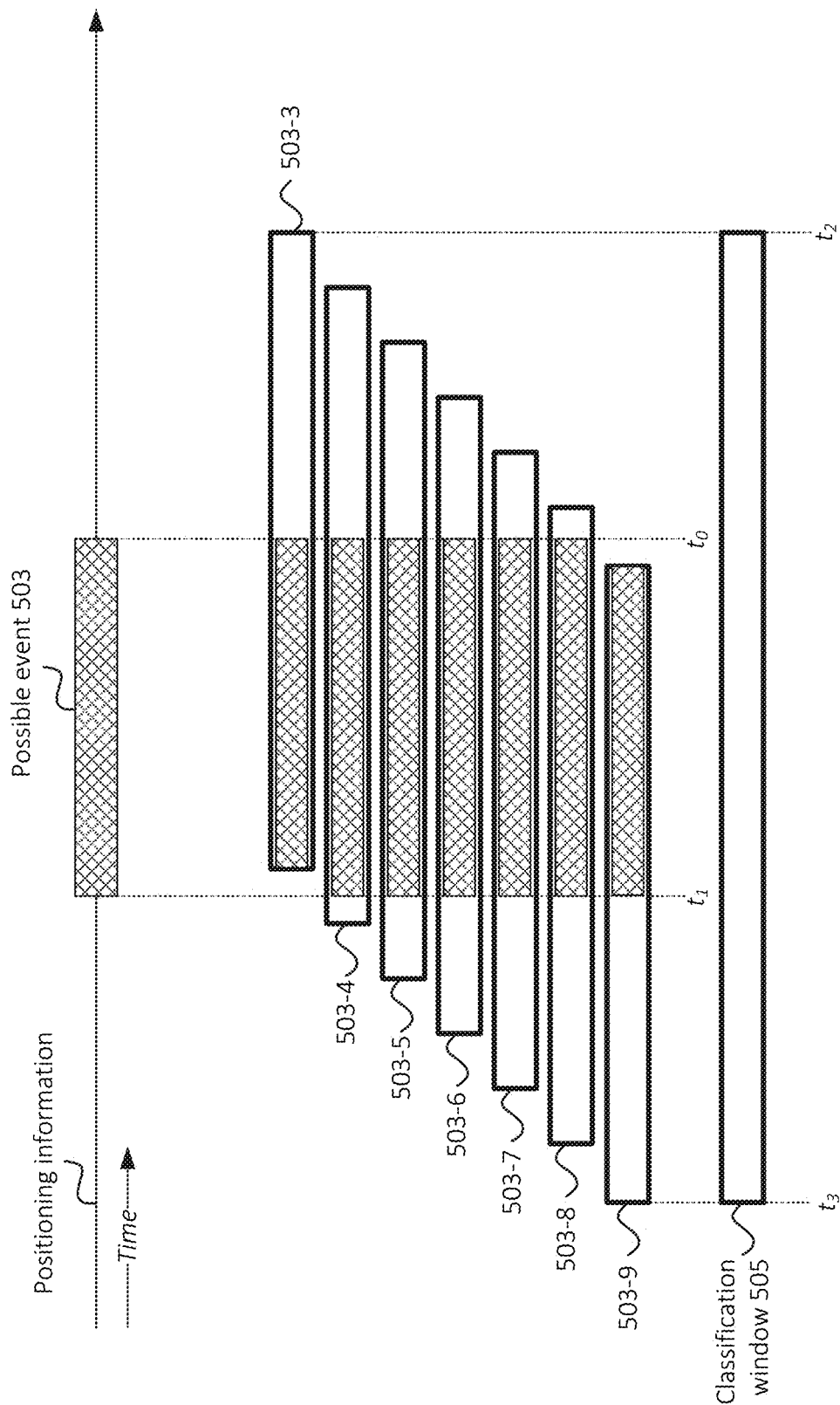

SYSTEMS AND METHODS FOR REDUCED RESOURCE UTILIZATION FOR EVENT MODELING

BACKGROUND

Advanced modeling techniques, such as artificial intelligence/machine learning ("AI/ML") techniques, may be used to identify or classify the occurrence of events, trends, anomalies, or other aspects of a data set. Such techniques may be relatively processor-intensive, time-intensive, and/or otherwise resource-intensive.

BRIEF DESCRIPTION OF THE DRAWINGS

FIGS. 5B and 5C illustrate example classification time windows, in accordance with some embodiments;

DETAILED DESCRIPTION OF EXAMPLE EMBODIMENTS

The following detailed description refers to the accompanying drawings. The same reference numbers in different drawings may identify the same or similar elements.

Embodiments described herein provide for the detection and/or classification of events associated with a set of data using advanced modeling techniques, such as AI/ML techniques, in a manner that consumes resources as compared to performing a full analysis of the set of data using such techniques. For example, as discussed herein, a pre-processing operation (e.g., a more lightweight or less resource-intensive operation) may be performed on the set of data to identify possible events, and a modeling and/or classification operation (e.g., utilizing advanced and/or more resource-intensive operations, such as using one or more AI/ML techniques) may be performed on portions of the set of data and/or on a different set of data to affirmatively detect and/or classify the events that were potentially identified via the pre-processing operation. In some embodiments, the pre-processing operation may be performed on a first set of data over a given timeframe, such as sensor data, positional data, etc., while the modeling and/or classification operation may be performed on the first set of data and/or a second set of data (e.g., audio data, video data, etc.) that is associated with the same timeframe.

For example, the second set of data may be associated with an audio and/or video stream that portrays a two-hour long sports game, while the particular timeframe pertains to a relatively small portion of the sports game, such as a ten-second long highlight or play. Forgoing performing the modeling and/or classification operation on the full audio and/or video stream during times outside of the particular timeframe may conserve resources, such as processing resources, time, storage resources, network resources, etc., without sacrificing the robust and accurate classification of events occurring during the particular timeframe (e.g., the identification of the highlight or play). Further, the identified events may be used to modify a content stream (e.g., by providing audio and/or video indicating the identified event), modify a capture of the content stream (e.g., reposition or move one or more automated cameras used to capture video associated with the event), and/or perform other actions, which may enhance the user experience of viewing such content streams.

Figure 1A:
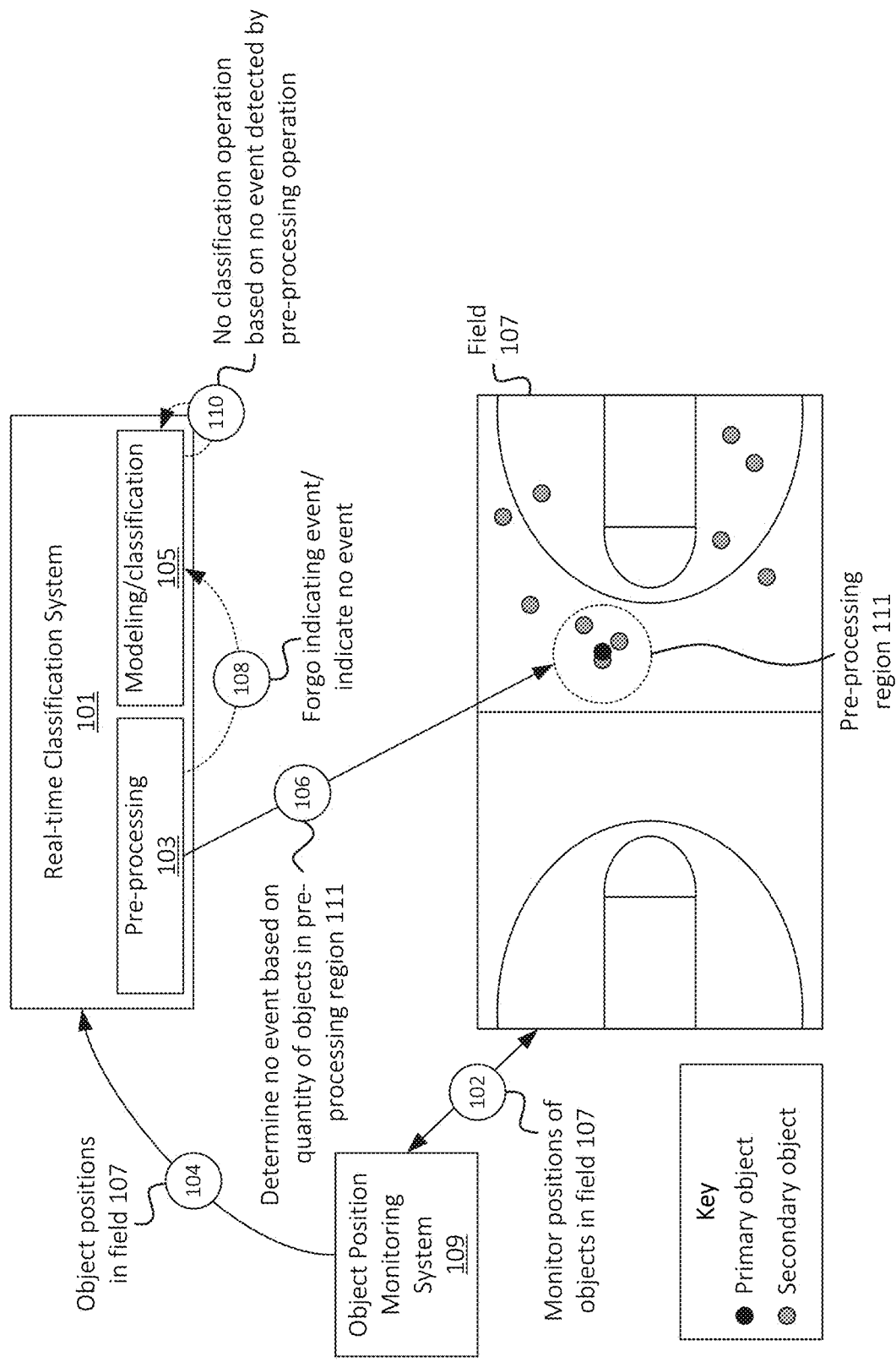
FIGS. 1A, 1B, 2A, and 2B illustrate an example overview of one or more embodiments described herein.

As shown in FIG. 1A, Real-time Classification System ("RCS") 101 may include pre-processing system 103 and modeling and/or classification system 105 (referred to herein as "modeling system 105" for the sake of brevity). RCS 101 may, as discussed herein, detect events occurring with respect to field 107. In this example, field 107 relates to a basketball floor, in which ten players (i.e., two teams of five players) and one ball are present, and where events may be identified based on positions, movements, and/or other attributes of one or more players and/or the ball. In practice, field 107 may relate to another sport (e.g., football, soccer, baseball, etc.), and/or may relate to some other type of area, region, structure, landmark, etc. (e.g., a road, a building, a park, etc.).

In some embodiments, field 107 may include a primary object and one or more secondary objects. In the examples discussed herein, the primary object may represent the ball in a basketball game, while the secondary objects may represent the players playing in the basketball game. In some embodiments, the positions (e.g., two-dimensional or three-dimensional positions) of the primary object and/or some or all of the secondary objects may be monitored by Object Position Monitoring System ("OPMS") 109. For example, in some embodiments, the primary object and/or some or all of the secondary objects may have an embedded or affixed positional sensor that may communicate with OPMS 109 and/or one or more other devices or systems (e.g., geofencing devices or systems), based on which OPMS 109 may monitor (at 102), in real time or near-real time, the positions of the primary object and/or the secondary objects within field 107.

Field 107, as shown in FIG. 1A, may be a "snapshot" or may otherwise reflect information associated with a particular time or time window, as monitored by OPMS 109. In practice, multiple instances of field 107, and/or the information represented therewith, may represent a time series of positions of objects within field 107. In some embodiments, a particular instance of field 107 may represent positions of objects within field 107 at a specific moment in time. In some embodiments, a particular instance of field 107 may represent positions of objects within field 107 during a specific time window (e.g., an average or "smoothed" position information over the time window, in situations where the object has moved during the time window). For example, assuming that field 107 represents positions of objects within field 107 during a 0.1-second time window, OPMS 109 may monitor 35 instances of field 107 during a 3.5-second time window (e.g., 35 sets of object positioning data over 3.5 seconds). As another example, assuming that field 107 represents the instantaneous position of objects within field 107 on a 0.1-second interval, 35 instances of field 107 may represent the positions of the objects within field 107 every 0.1 seconds over a 3.5-second time window.

In some embodiments, OPMS 109 may monitor position information on a relatively high frequency, such as 100 or more monitoring cycles per second. In some embodiments, OPMS 109 may monitor position information at an interval that matches or is otherwise based on a frequency associated with a camera system that captures video associated with field 107, such as 24 frames per second ("FPS"), 35 FPS, 60 FPS, or at some other suitable frequency or interval.

OPMS 109 may further provide (at 104) some or all of the position information to RCS 101 (e.g., to pre-processing system 103) in real time or near-real time. For example, in some embodiments, OPMS 109 may provide (at 104) such information over a network, or OPMS 109 and RCS 101 (and/or a portion thereof, such as pre-processing system 103) may be co-located and/or may be implemented by the same device or system.

Pre-processing system 103 may, on an ongoing basis (e.g., every millisecond, every data point from OPMS 109, every second, and/or on some other ongoing basis) determine whether an event may have potentially occurred or is likely to occur within field 107 (referred to herein as a "possible event"), based on the received position information. For example, pre-processing system 103 may evaluate one or more conditions, criteria, etc. (referred to herein as "pre-processing criteria") relating to some or all of the objects (e.g., the primary object and/or the secondary objects), to determine whether the position information indicates a possible event. In this example, the pre-processing criteria may be met when at least a threshold quantity of secondary objects (e.g., four or more) are within pre-processing region 111, where objects within pre-processing region 111 are within particular threshold proximity of the primary object. Pre-processing region 111 may be dynamic, such that a position of pre-processing region 111 in field 107 moves in relation to the primary object (e.g., a center of pre-processing region 111 may follow or be the same as a center of the primary object). Such relationships between objects may signify, in the example of a basketball game, at least four players that are within a particular distance of the ball.

In some embodiments, pre-processing region 111 may be defined differently than the example of FIG. 1A, such as a different shape than a circle, such as a square, a rectangle, an oval, etc. Further, as discussed below, different or additional pre-processing criteria may be used. Further, examples herein are described in the context of one type of event. In practice, RCS 101 may identify, including using pre-processing system 103, different types of events that may be associated with different pre-processing criteria. In some embodiments, such pre-processing criteria may be hierarchical, such that if RCS 101 detects that two different types of possible events, RCS 101 may perform further processing (e.g., using AI/ML techniques or other modeling techniques, as discussed below) to detect a higher ranked possible event in lieu of, or prior to, performing further processing on a lower ranked possible event. In some embodiments, RCS 101 may evaluate different types of possible events differently, such that multiple different concurrent events may be detected and/or classified.

In the example of FIG. 1A, pre-processing system 103 may determine (at 106), that no event has occurred, as pre-processing criteria associated with a particular event is not met. As discussed above, the pre-processing criteria may not be met in this example because fewer than four secondary objects are within pre-processing region 111 (e.g., within a threshold distance of the primary object). Based on determining (at 106) that no possible event has been detected based on the positions of the primary object and secondary objects within field 107, pre-processing system 103 may forgo (at 108) indicating a possible event, and/or may provide an indication that no possible event was detected within field 107 during the timeframe depicted in FIG. 1A. As such, modeling system 105 may forgo (at 110) performing a classification operation (e.g., which may include modeling techniques, AI/ML techniques, and/or other resource-intensive techniques) on information associated with this timeframe. As noted above, such information may include streaming audio, streaming video, the positioning data monitored by OPMS 109, and/or other types of information. Forgoing performing such techniques may conserve processor resources associated with modeling system 105, energy resources associated with modeling system 105, time, and/or other resources. Further, forgoing performing such techniques by modeling system 105 may conserve network resources that would otherwise be consumed to deliver the streaming audio, streaming video, etc. to modeling system 105.

Figure 1B:
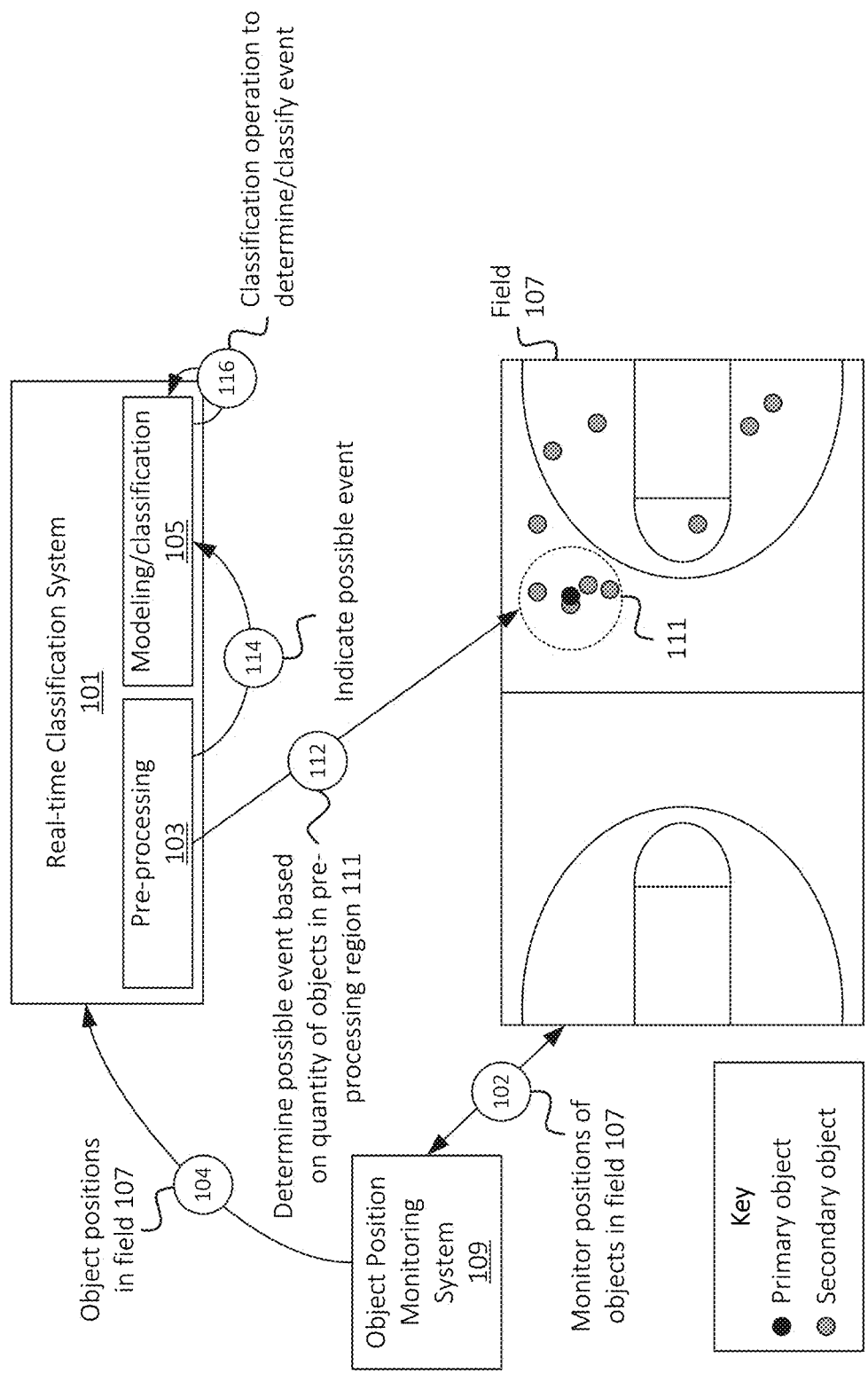

FIG. 1B illustrates an example of field 107 at a different timeframe than the one shown in FIG. 1A. For example, in FIG. 1B, the positions of the primary object and some or all of the secondary objects may be different than in FIG. 1A. RCS 101 may continue to receive (at 104) positions of objects within field 107, as monitored (at 102) by OPMS 109. In this example, pre-processing system 103 may determine (at 112) the occurrence of a possible event, as the pre-processing criteria associated with the possible event are met in this example. That is, here, four or more secondary objects are within pre-processing region 111.

As such, pre-processing system 103 may indicate (at 114) the occurrence of a possible event to modeling system 105 at this timeframe. In some embodiments, as discussed below, pre-processing system 103 may indicate the occurrence of the same event to modeling system 105 over multiple timeframes, and/or may otherwise indicate a start and time associated with the detected possible event. As further discussed below, modeling system 105 may perform (at 116) a classification operation (e.g., using AI/ML techniques, modeling techniques, and/or other suitable techniques) based on the indicated timeframes, start and stop time, etc. Modeling system 105 may perform such operation on information that is different from, and/or in addition to, positioning data as monitored (at 102) by OPMS 109, such as streaming audio content, streaming video content, and/or other information. Such classification may be more precise, reliable, and/or accurate than evaluating pre-processing criteria for the occurrence of an event, but may consume more processing resources, network resources, time, etc. than evaluating the position data based on the pre-processing criteria.

Figure 2A:
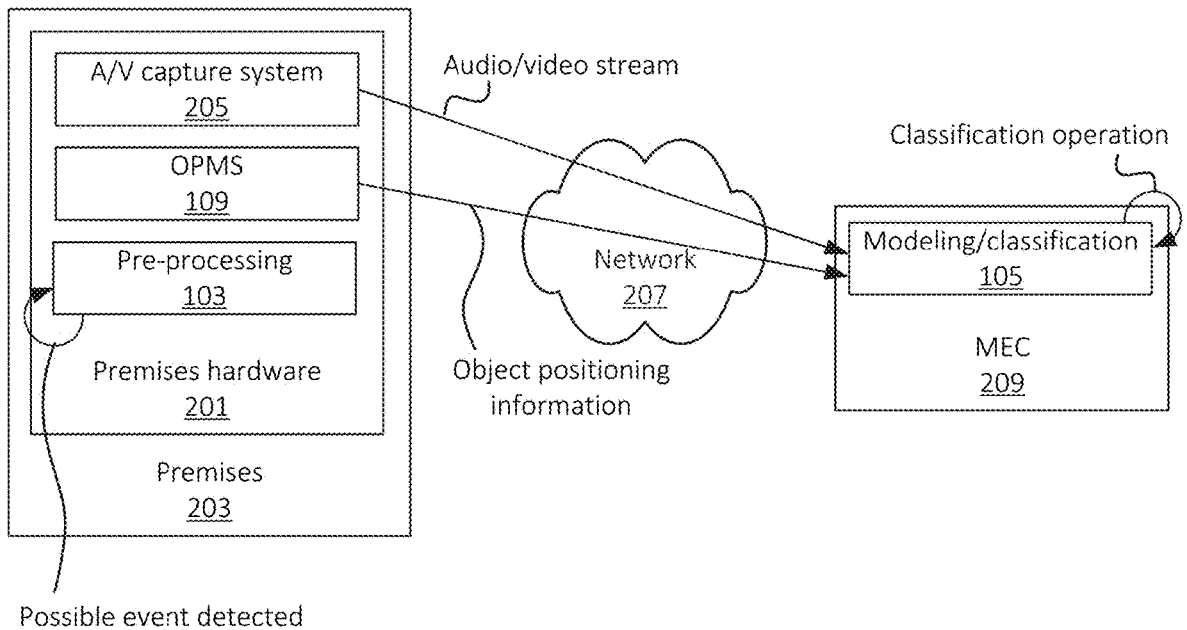
Figure 2B:
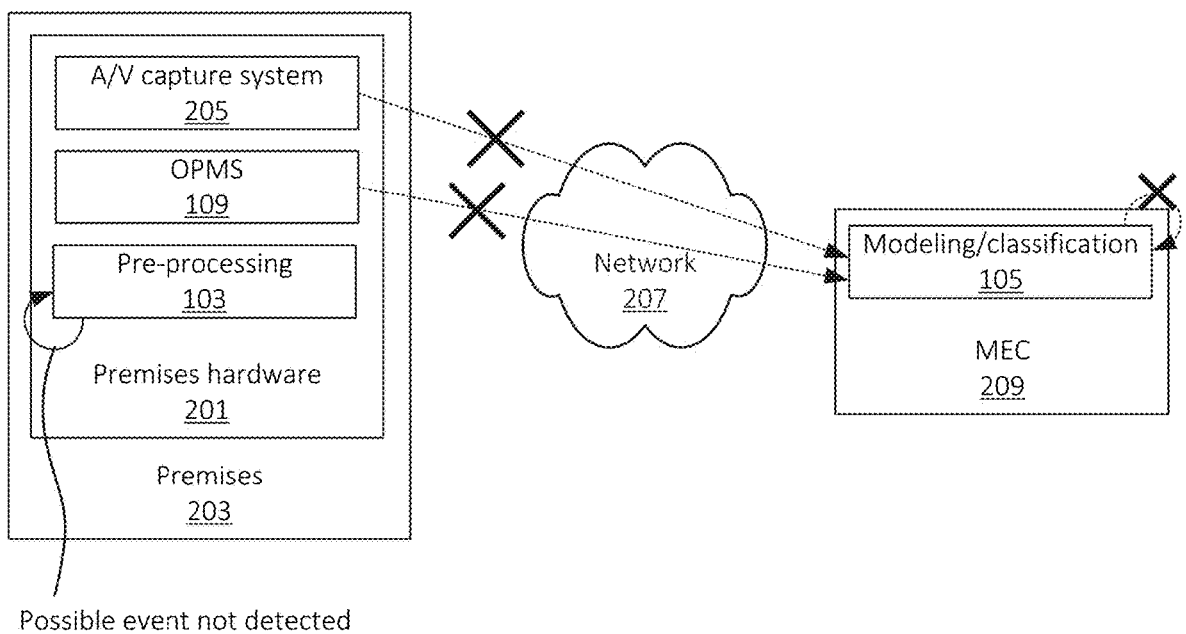

In some embodiments, pre-processing system 103 and modeling system 105 may be implemented by different devices or systems, and may communicate via one or more networks (e.g., via a RAN of a wireless network, via the Internet, and/or some other type of network). For example, as shown in FIGS. 2A and 2B, a set of premises hardware 201 associated with premises 203 may implement pre-processing system 103, OPMS 109, and audio/video capture system 205. Premises 203 may be, for example, a building, a facility, an arena, etc. in which premises hardware 201 is located, and/or with which premises hardware 201 is otherwise associated or communicatively coupled. Premises hardware 201 may include, for example, one or more servers, workstations, datacenters, or the like, which may implement functionality associated with pre-processing system 103, OPMS 109, audio/video capture system 205, and/or one or more other systems. Audio/video capture system 205 may include one or more cameras, microphones, or the like, that may capture audio data and/or video data (e.g., content pertaining to the same field 107 or objects for which OPMS 109 monitors positioning information). Audio/video capture system 205 may include and/or may be communicatively coupled to one or more components that generate and/or output a content stream, such as an audio stream, a video stream, and/or some other type of content stream, based on the captured audio and/or video.

Premises hardware 201 may include one or more network interfaces, may implement one or more application programming interfaces ("APIs"), and/or some other suitable communication pathway via which premises hardware 201 may communicate (e.g., via network 207) with modeling system 105 and/or with one or more devices or systems that implement modeling system 105. Modeling system 105 may, in some embodiments, be implemented by Multi-Access/Mobile Edge Computing ("MEC") device 209, referred to sometimes herein simply as "MEC" 209, which may be deployed at one or more edges of 207 (e.g., may be deployed at a base station of a RAN associated with or included in network 207). Traffic communicated between premises hardware 201 and MEC 209 may be handled by MEC 209 without routing the traffic to or through a core network, the Internet, and/or some other network. Further, MEC 209 may be outfitted with relatively large amounts of processing resources, memory resources, etc. in relation to premises hardware 201. As such, MEC 209 may be able to perform classification functions (e.g., by implementing modeling system 105) faster than premises hardware 201 would be able too. As such, MEC 209 may be able to quickly provide relatively low-latency service, such as classification operations on object positioning information, an audio/video stream, etc. provided by premises hardware 201, thereby providing a real-time or near real-time user experience.

For example, as shown in FIG. 2A, when pre-processing system 103 detects a possible event with respect to a particular timeframe, OPMS 109 may output object positioning information monitored during the particular timeframe to modeling system 105 via network 207, and/or audio/video capture system 205 may output a content stream to modeling system 105 via network 207. On the other hand, as shown in FIG. 2B, when pre-processing system 103 has not detected a possible event, OPMS 109 and/or audio/video capture system 205 may forgo outputting traffic (e.g., object positioning information and/or a content stream) to modeling system 105, thus conserving network resources associated with premises 203, network 207, and/or MEC 209.

Figure 3:
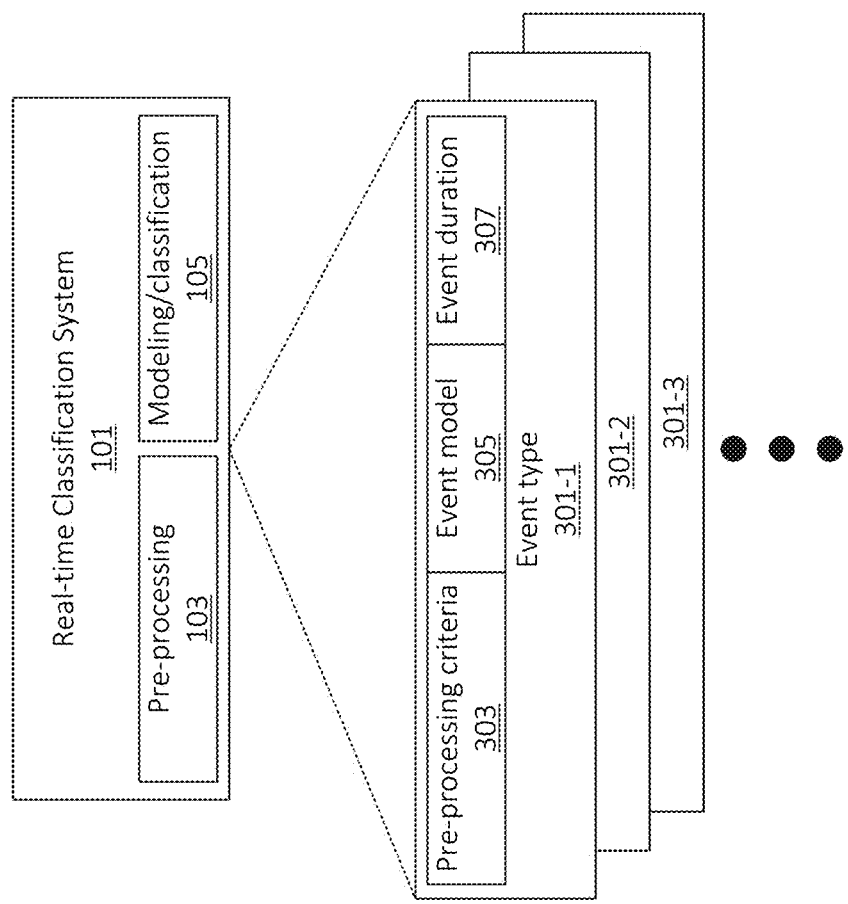
FIG. 3 illustrates an example of information associated with different event types, in accordance with some embodiments.

As noted above, different types of events may be identified by RCS 101, which may each be associated with respective sets of information. FIG. 3 illustrates an example of information associated with different event types, which may be received, maintained, refined, etc. by RCS 101. In some embodiments, some or all of such information may be maintained by pre-processing system 103 to perform the pre-processing operations described herein, and/or by modeling system 105 to perform the classification operations described herein.

As shown, RCS 101 may maintain information regarding multiple event types 301 (e.g., event types 301-1 through 301-3 and/or additional or different event types). The information for a particular event type 301 may include pre-processing criteria 303 for the particular event type, event model 305, and event duration 307. As noted above, pre-processing criteria 303 may include conditions, criteria, etc. based on which a possible occurrence of a particular event type 301 may be determined by pre-processing system 103. Event model 305 may include one or more models, such as AI/ML models, statistical models, or other types of models based on which the occurrence of the particular event type 301 may be identified, classified, confirmed, etc. by modeling system 105. In some embodiments, pre-processing criteria 303 may include criteria related to a first set of information (e.g., positioning data monitored by OPMS 109 or other suitable types of data), while event model 305 may include models, criteria, conditions, etc. associated with a second set of information (e.g., audio content, video content, and/or other types of information). In some embodiments, event model 305 may further include models, criteria, conditions, etc. associated with the first set of information. That is, event model 305 may pertain to the first set of information and additional and/or different information, in some embodiments.

Event duration 307 may indicate a measure of length or duration of the particular event type 301. Event duration 307 may be based on identifying past occurrences of the particular event type 301, and/or may be based on one or more simulations or training of event model 305. In some embodiments, event duration 307 may be included in event model 305 and/or may otherwise be derived from event model 305. Event duration 307 may specify an average duration of event type 301 (e.g., based on a set of instances of event type 301), a maximum duration of event type 301, a minimum duration of event type 301, or some other value based on a set (e.g., a historical set) of instances of event type 301. As discussed below, event duration 307 may be used by pre-processing system 103 to identify one or more timeframes during which modeling system 105 should perform classification operations described below.

Figure 4:
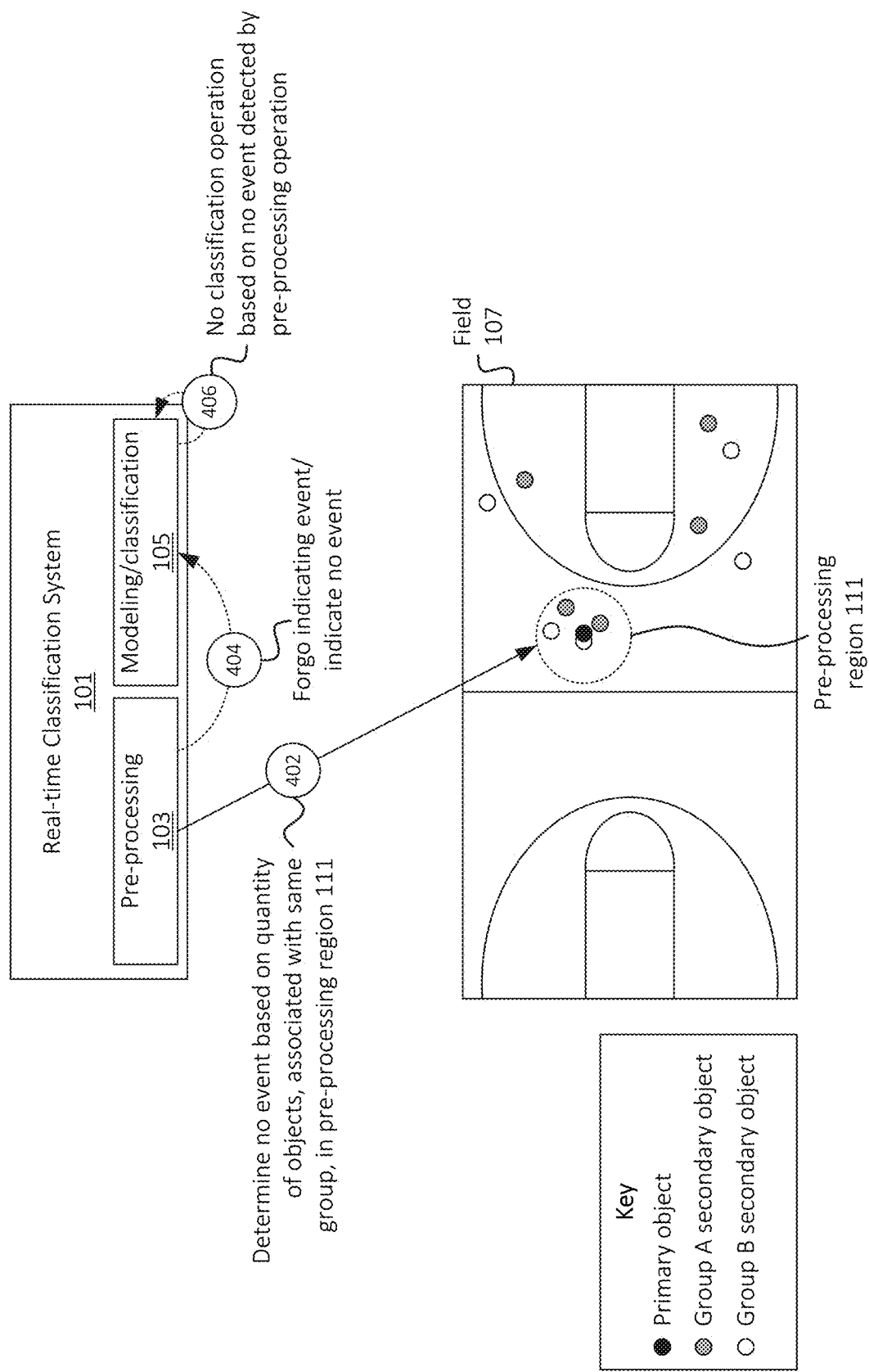
FIG. 4 illustrates an example of a pre-processing operation, in accordance with some embodiments.

FIG. 4 illustrates an example of using different pre-processing criteria 303 than the example shown in FIGS. 1A and 1B. In this example, different secondary objects may be associated with different groups, shown as "Group A" and "Group B." The secondary objects of one group may, for instance, represent players of one team, while secondary objects of another group may represent players of an opposing team. OPMS 109 may, in some embodiments, be configured to maintain information associating each secondary object with a particular group, such that the monitored positioning information may further indicate both the position of each secondary object within field 107, as well as a group with which each secondary object is associated. In some embodiments, each secondary object may be associated with a motion sensor having a particular identifier or group identifier, based on which OPMS 109 may track the positions of secondary objects on a per-group basis. In some embodiments, OPMS 109 may determine the group with which each secondary object is associated in some other suitable manner.

In some embodiments, additional or different information may be associated with each secondary object, and/or one or more relationships between multiple secondary objects may be specified. For example, one or more secondary objects may be associated with one or more flags, annotations, categories, etc., such as "defensive playmaker," "great shooter," "point guard," etc. Additionally, or alternatively, two or more particular secondary objects may be associated with one or more flags, annotations, categories, etc., such as "rivals," "dynamic duo," etc. Such flags, annotations, categories, etc. may be used to specify pre-processing criteria for particular events or event types.

For example, a "Watch out for this dynamic duo!" event type 301 may include pre-processing criteria 303 that is met when two secondary objects that are associated with a "dynamic duo" flag are within 3 meters of each other and the primary object is within 10 centimeters of one of these two secondary objects. In practice, other types of pre-processing criteria 303 may be associated with other event types 301.

In the example of FIG. 4, assume that a particular event type 301 is associated with pre-processing criteria 303 that is met when at least three secondary objects of the same group are within pre-processing region 111 (e.g., within a particular distance of the primary objects). In this example, although four secondary objects are within pre-processing region 111 in the depicted timeframe, pre-processing system 103 may determine (at 402) that pre-processing criteria 303 for the particular event type 301 is not met because at least three secondary objects of the same group are not within pre-processing region 111 (e.g., the four secondary objects within pre-processing region 111 are two secondary objects of each different group). As the pre-processing criteria is not met, pre-processing system 103 may forgo (at 404) indicating an event to modeling system 105, and/or may indicate no event to modeling system 105, based on which modeling system 105 may forgo (at 406) performing a classification operation on a content stream or other information associated with the particular timeframe. Further, as discussed above, pre-processing system 103 and/or one or more other devices or systems may refrain from outputting streaming content or other information to modeling system 105, in situations where pre-processing system 103 and modeling system 105 are implemented by discrete devices or systems that communicate via one or more networks.

Figure 5A:
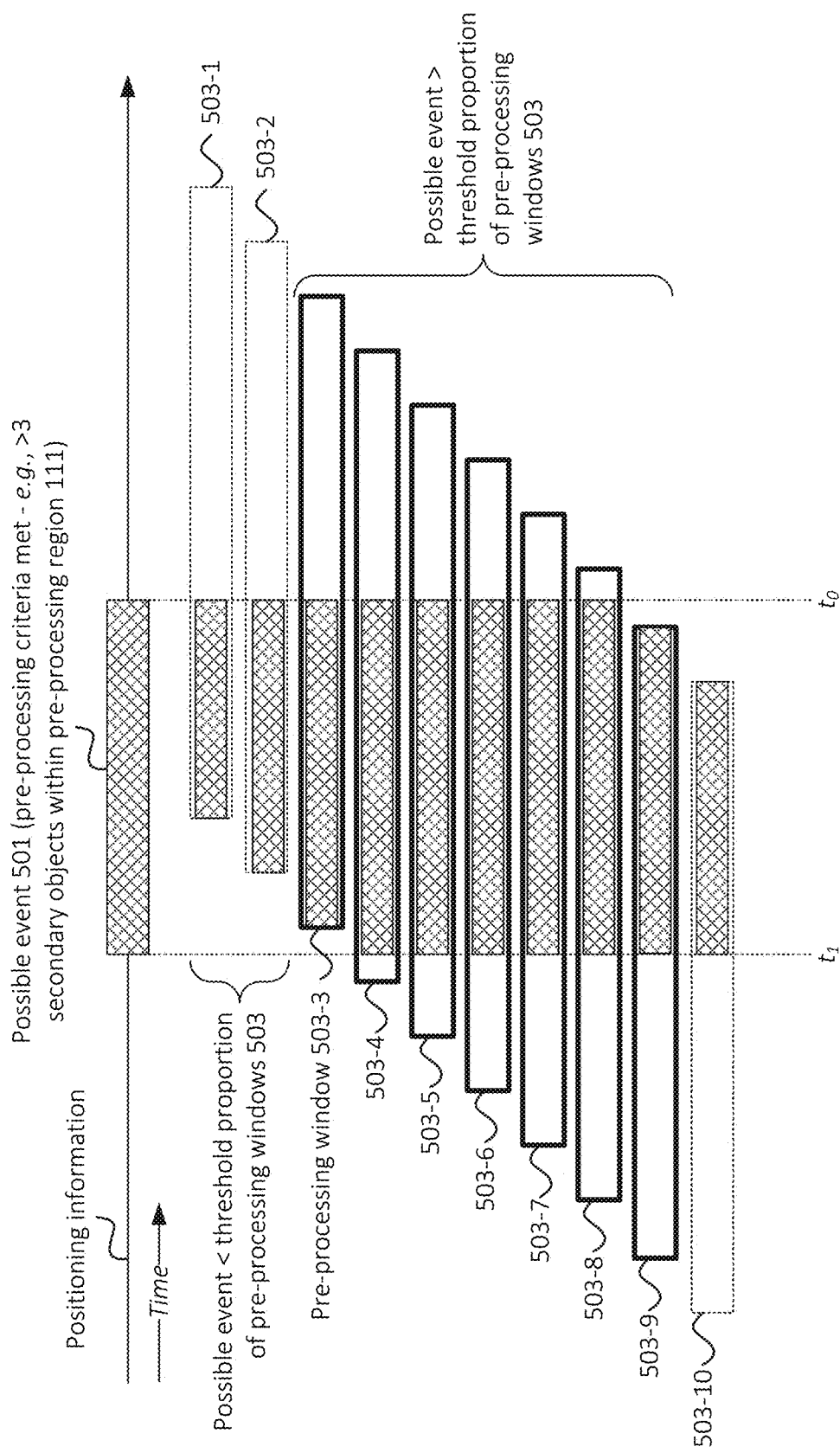
FIG. 5A illustrates an example of using a pre-processing operation to determine a time window for which to perform a modeling and/or classification operation, in accordance with some embodiments.
Figure 5C:
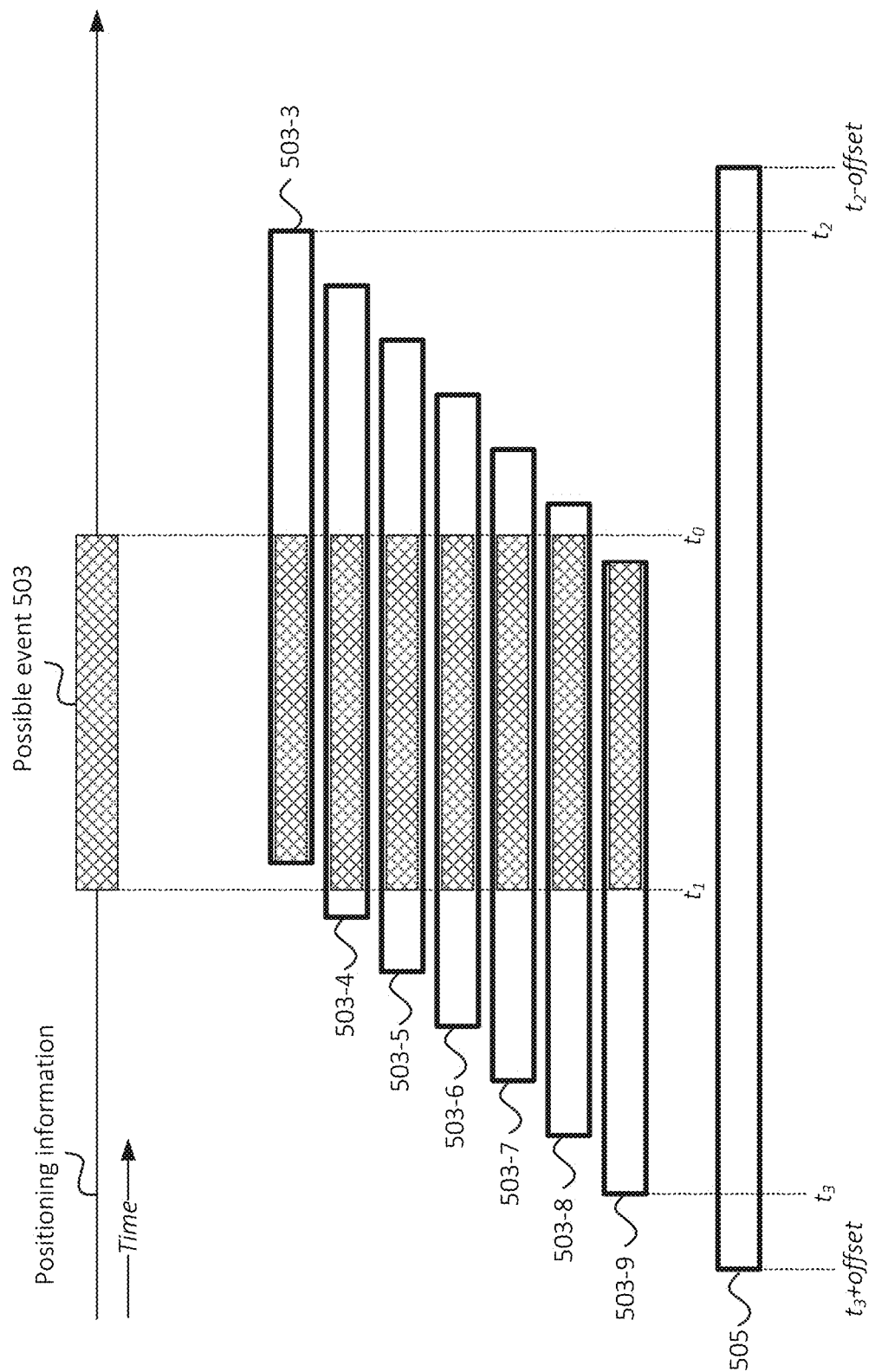

FIGS. 5A-5C illustrate an example of determining a timeframe for which modeling system 105 should perform a classification operation. In some embodiments, such timeframe may be determined by pre-processing system 103, and/or may be determined based on pre-processing operations performed by pre-processing system 103. As shown in FIG. 5A, for example, assume that a particular possible event 501 falls between times $t_0$ and $t_1$ (e.g., where time $t_1$ occurs after time $t_0$). That is, pre-processing criteria 303 for a particular event type 301 may be met during times $t_1$ and $t_1$. This may represent a "ground truth," inasmuch as the depiction of possible event 501 reflects the actual occurrence of pre-processing criteria 303 being met (e.g., based on monitored position information associated with field 107 or other suitable information).

Pre-processing system 103 may be configured to analyze such monitored position information on a rolling time window basis, such as determining whether pre-processing criteria 303 has been met during a series of time windows 503. Time windows 503 may be, for example, a static duration (e.g., five seconds, ten seconds, etc.). In some embodiments, time windows 503 may vary based on the particular possible event being evaluated. For example, a first type of possible event may be associated with a five-second time window 503 (e.g., event duration 307-1 of a first event type 301-1 may be up to about five seconds long), while a second type of possible event may be associated with a ten-second time window 503 (e.g., event duration 307-2 of a second event type 301-2 may be up to about ten seconds long). In the examples shown herein, time windows 503 are shown as being substantially longer than the duration of possible event 501, in order to illustrate the concepts described below. In practice, time windows may be approximately equal to the duration of possible event 501, and/or may be shorter in duration (e.g., relative to possible event 501) than the examples shown herein.

Pre-processing system 103 may identify time windows 503 for which possible event 501 was detected for at least a threshold ratio or proportion of the time windows 503. For example, while possible event 501 was detected in time windows 503-1 and 503-2 (e.g., the pre-processing criteria for possible event 501 was met during time windows 503-1 and 503-2), possible event 501 may have only been detected in a relatively small (e.g., less than a threshold) portion of time windows 503-1 and 503-2. On the other hand, possible event 501 may be identified (e.g., by pre-processing system 103) as occupying at least the threshold ratio or proportion of time windows 503-3 through 503-9. Additionally, possible event 501 may be identified as not occupying at least the threshold ratio or proportion of time window 503-10.

Accordingly, time windows 503-3 through 503-9 may be used to identify a timeframe (e.g., a "classification window," as discussed below) during which modeling system 105 should perform one or more classification operations to affirmatively identify the event and/or perform other types of processing. For example, as shown in FIG. 5B, classification window 505 may start at the earliest time associated with time windows 503-3 through 503-9 (e.g., time $t_2$), and may end at the latest time associated with time windows 503-3 through 503-9 (e.g., time $t_3$).

In some embodiments, as shown in FIG. 5C, classification window 505 may start before the earliest time associated with time windows 503-3 through 503-9 (e.g., time $t_2$–offset), and/or may end after the latest time associated with time windows 503-3 through 503-9 (e.g., time $t_3$+offset). Expanding classification window 505 in this manner may allow for modeling system 105 to classify events that extend beyond the pre-processing criteria, such as events for which the pre-processing criteria is only satisfied for a portion of the duration of the event. As one example, a particular event may pertain to a basketball play, lasting about seven to ten seconds, in which four players are within pre-processing region 111 for about three seconds and then one of the players subsequently exits pre-processing region 111 and the ball is passed to such player within the next four to seven seconds. Thus, in this example, while the pre-processing criteria is associated a first timeframe, the actual event may be associated with a second (e.g., a longer and/or offset) timeframe.

Figure 5D:
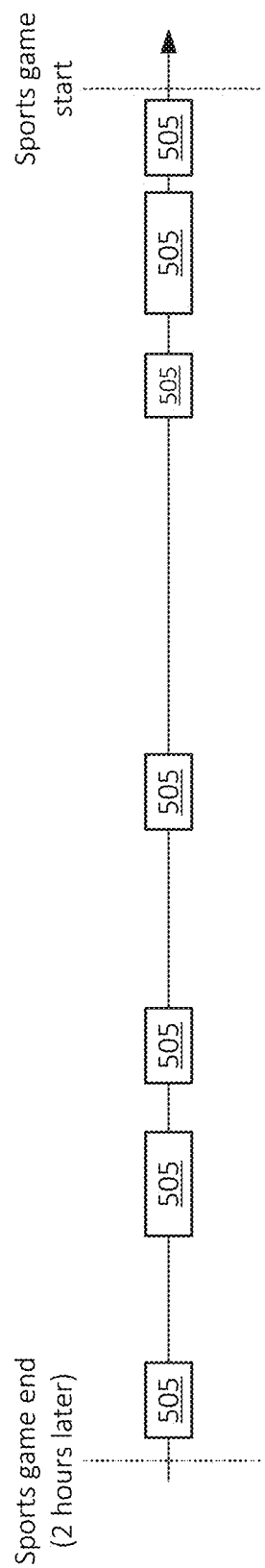
FIG. 5D illustrates an example of classification time windows that may be identified within an overall timeframe, in accordance with some embodiments.

As shown in FIG. 5D, as a result of identifying particular classification windows 505, a relatively small portion of a given timeframe may be identified for classification operations to be performed by modeling system 105. For example, during the course of a two-hour sports game, a number of classification time windows 505 may be identified, which may be less than 20%, less then 10%, less then 5%, etc. of the entire duration of the sports game. As such, modeling system 105 may perform classification operations on streaming content and/or other information for only this relatively small portion of the sports game, rather than on an entire two-hour long content stream, thus conserving resources.

Figure 6:
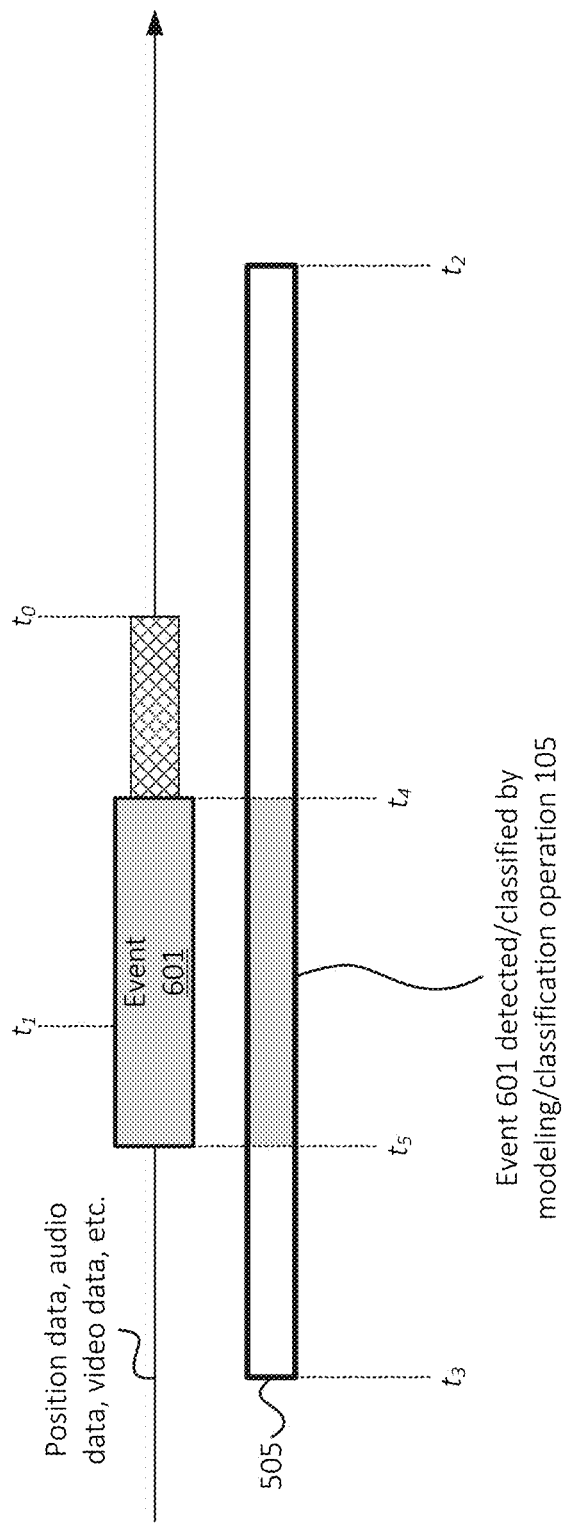
FIG. 6 illustrates examples of using a classification time window to detect and/or classify an event, in accordance with some embodiments.

For example, as shown in FIG. 6, modeling system 105 may receive an indication of classification window 505, including start time $t_2$ and end time $t_3$. Modeling system 105 may accordingly perform one or more classification operations on position data, audio data, video data, etc. associated with classification window 505 (e.g., between times $t_2$ and $t_3$). Such classification operations may include utilizing one or more AI/ML techniques, one or more modeling techniques, convolutional neural networks, computer vision (e.g., image and/or video recognition and/or classification techniques), or other suitable techniques to identify event 601. For example, based on such classification operations, modeling system 105 may identify the occurrence of event 601 between times $t_4$ and $t_5$. As noted above, event 601 may, in some situations, extend beyond possible event 501 (e.g., extend beyond times $t_0$ and/or $t_1$). Event 601, as depicted here, may be a "ground truth," inasmuch as event 601 is an actual event that is reflected by the position data, audio data, video data, etc. analyzed by modeling system 105.

Figure 7:
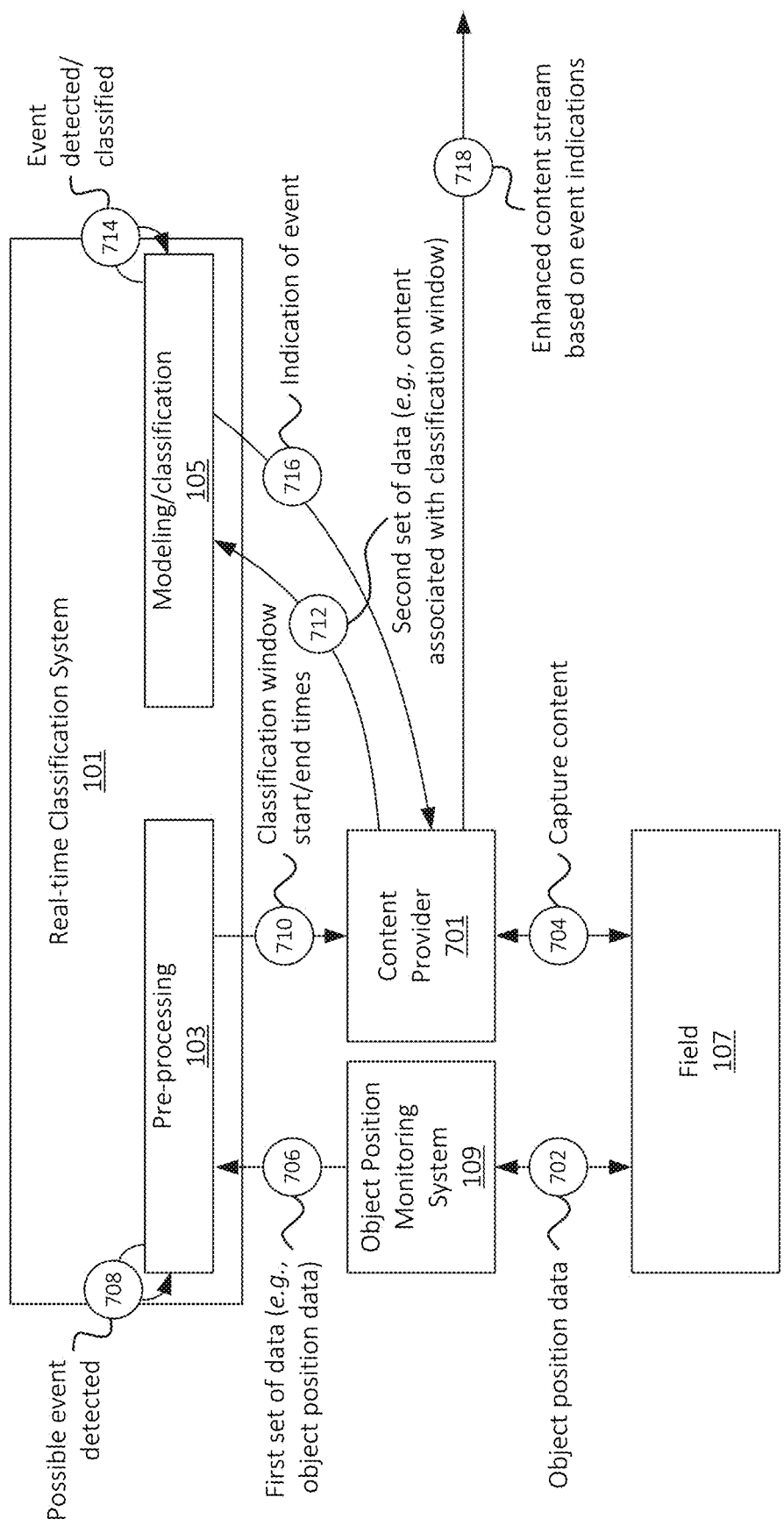
FIGS. 7-9 illustrate examples of pre-processing and modeling to detect an event, in accordance with some embodiments.
Figure 8:
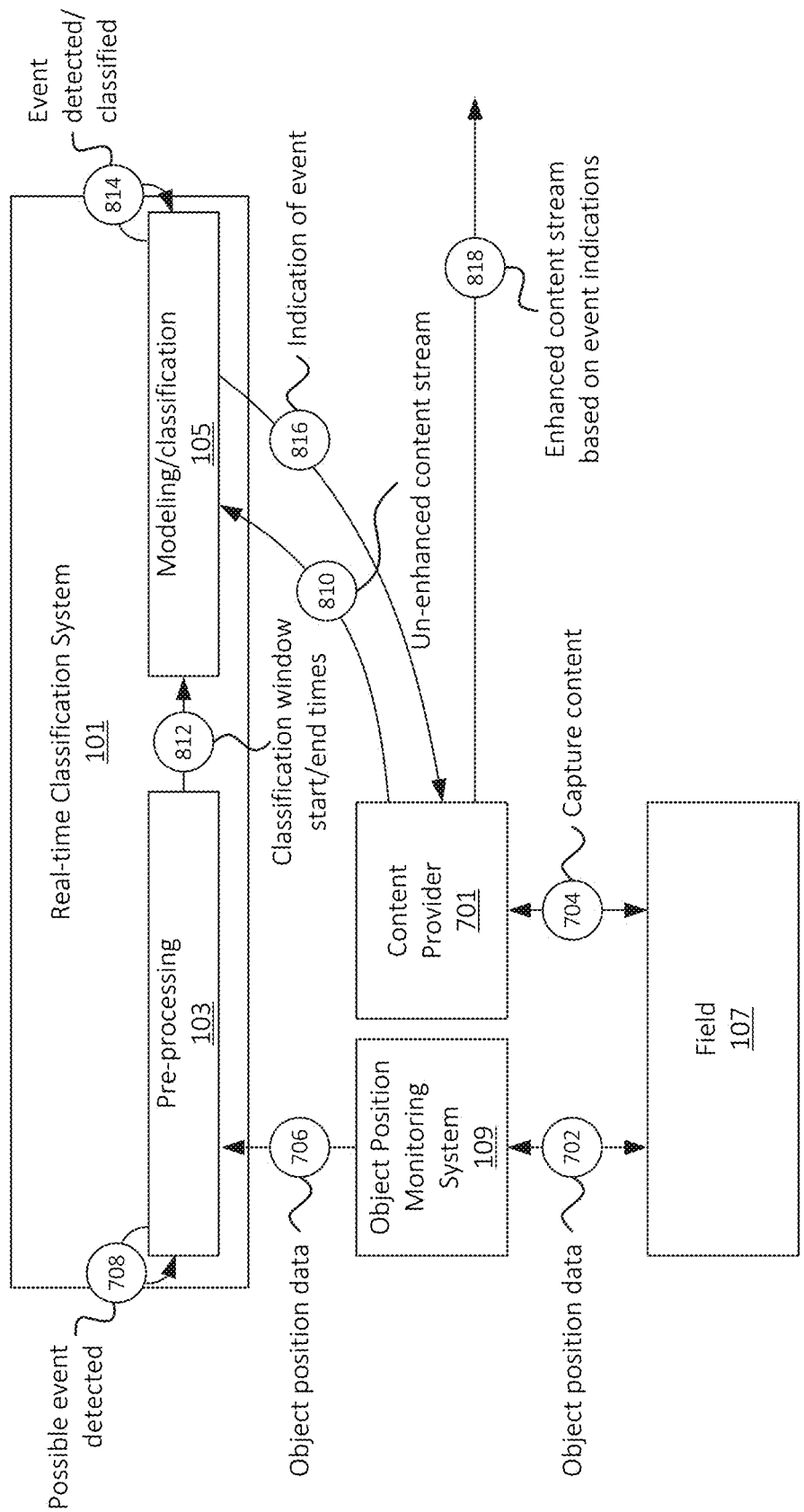
Figure 9:
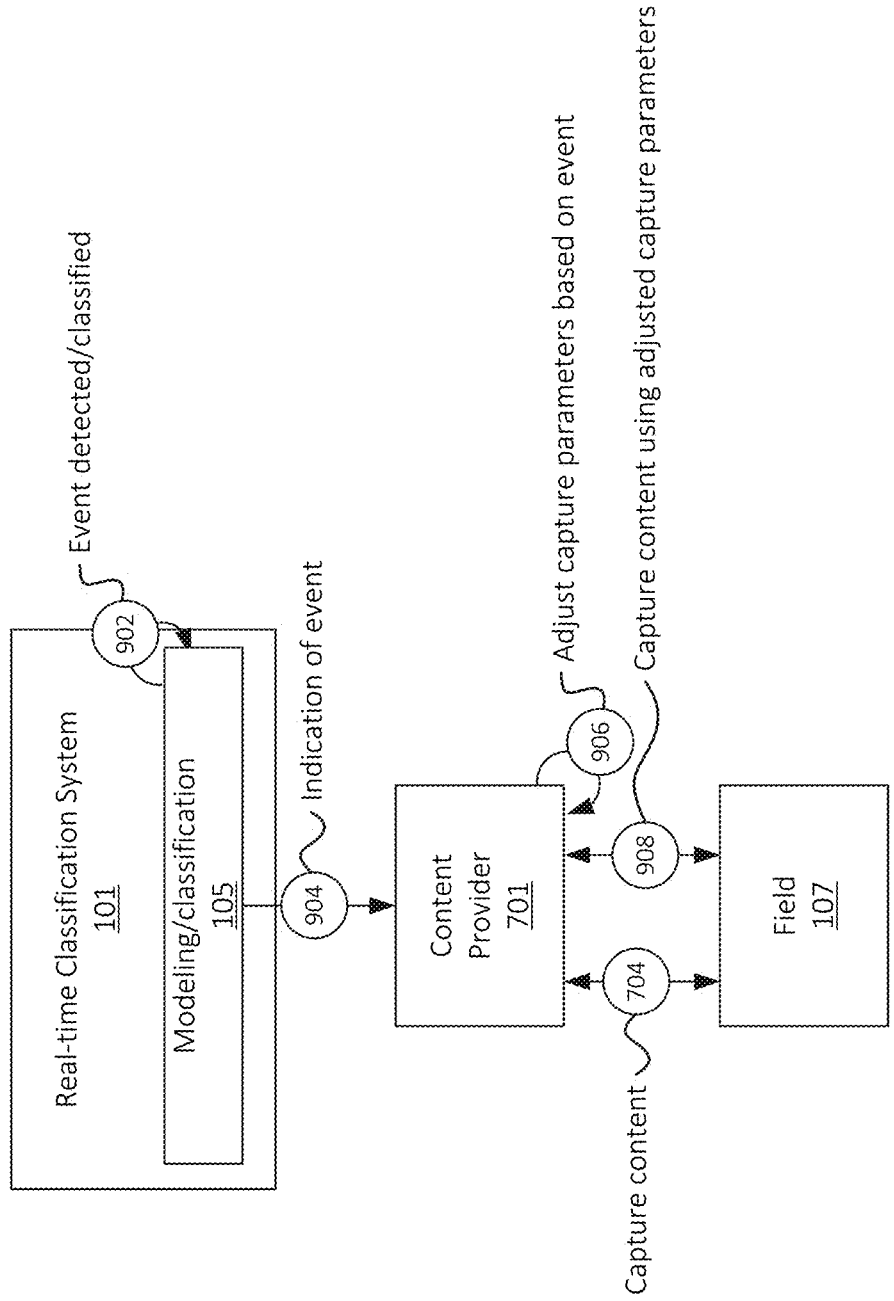

FIGS. 7-9 illustrates example communications and/or operations that may be performed in accordance with some embodiments to detect the occurrence of events. As shown in FIG. 7, for example, OPMS 109 may receive and/or monitor (at 702) object position data associated with field 107. Further, content provider 701 may capture (at 704) content associated with field 107. For example, content provider 701 may include and/or may implement audio/video capture system 205 in order to capture audio content, video content, and/or other content associated with field 107. OPMS 109 may further provide (at 706) a first set of data on an ongoing basis, such as the monitored (at 702) object position data associated with field 107. OPMS 109 may provide such data in real-time or near-real time, such that RCS 101 receives the data as the data is monitored, collected, etc. (at 702) by OPMS 109.

Pre-processing system 103 may analyze the received (at 706) first set of data to determine whether any possible events are detected. For example, in some embodiments, pre-processing system 103 may utilize rolling time windows in the manner described above, and/or may otherwise identify particular times or timeframes during which a possible event was detected. Based on such pre-processing operations, pre-processing system 103 may detect (at 708) the occurrence of a particular possible event. Pre-processing system 103 may accordingly provide (at 710) an indication to content provider 701 that an event was detected, and/or may indicate times (e.g., a start time and an end time, a start time and a duration, etc.) at which the possible event was detected. As discussed above, such times may indicate a classification window during which modeling system 105 should perform classification operations (e.g., on a second set of data, such as content captured (at 704) by content provider 701) to detect and/or otherwise classify the event. In some embodiments, pre-processing system 103 may indicate (at 710) a type of possible event that was identified by pre-processing system 103.

Based on receiving (at 710) the information specifying the event and/or the classification window, content provider 701 may output (at 712) the second set of data (e.g., audio content, video content, etc. captured (at 704) by content provider 701) that corresponds to the classification window. In some embodiments, content provider 701 may further provide (at 712) an indication of the type of possible event that was identified by pre-processing system 103.

In this manner, content provider 701 may forgo providing captured content, that does not correspond to a given classification, to modeling system 105. As discussed above, forgoing providing such captured content may conserve network resources or other resources. Further, in some embodiments, when modeling system 105 does not receive captured content from content provider 701, modeling system 105 may not consume processing resources or other resources to perform classification operations on such content.

Modeling system 105 may, based on the provided content, detect and/or classify (at 714) the particular event. In some embodiments, modeling system 105 may use modeling techniques, AI/ML techniques, or other suitable techniques on the second set of data to determine whether any event models 305 of any available event types 301 match, correspond to, or are otherwise associated with the second set of data (e.g., that the second set of data indicates the occurrence of an event of a particular type 301). In some embodiments, modeling system 105 may use such techniques to determine whether the second set of data indicates an occurrence of a particular event type 301 (e.g., which may be indicated by pre-processing system 103 and/or content provider 701), or an occurrence of a particular event type 301 of a particular group of event types 301 (e.g., where different event types 301 may be grouped together). As noted above, in the context of a sports game, the event type may be a particular type of play, such as a "pick and roll," a "shot," a "block," etc. In other contexts, the event type may be or may include some other type of time series relationships between objects or other features of the content captured (at 704) by content provider 701 and/or the object position data monitored (at 702) by OPMS 109.

Assuming that modeling system 105 detected and/or classified (at 714) a particular event, modeling system 105 may output (at 716) an indication of the event to content provider 701, which may include providing one or more labels, classifications, or other suitable information associated with the event. As noted above, in situations where modeling system 105 is implemented by MEC 209 that is communicatively coupled to pre-processing system 103 or content provider 701 via a low-latency network (e.g., a Fifth Generation ("5G") network or some other type of network), modeling system 105 may be able to provide (at 716) indications of classified events within a relatively short time (e.g., within milliseconds) of the occurrence of the event, thus providing a real time or near-real time experience.

Content provider 701 may generate and output (at 718) an enhanced content stream based on the event indications. For example, content provider 701 may place a graphical overlay on video content, may zoom in on a portion of video content, may add audio effects to audio content, and/or may otherwise modify or enhance the content captured (at 704). Content provider 701 may output the enhanced content stream to one or more content distribution systems, content delivery networks, end users (e.g., viewers of a sports game), a video editing facility, or some other destination.

In some embodiments, as shown in FIG. 8, modeling system 105 may receive (at 810) a content stream from content provider 701, as content provider 701 captures (at 704) the content. In other words, modeling system 105 may receive, on an ongoing basis, a real time or near-real time streaming audio and/or video feed as captured (at 704) by content provider 701. Modeling system 105 may further receive (at 812) indications of possible events detected (at 708) by pre-processing system 103, such as an indication of one or more classification windows, based on which modeling system 105 may analyze the content stream to identify (at 814) an occurrence of a particular event. Modeling system 105 may provide (at 816) an indication of the event to content provider 701, which may generate and output (at 818) an enhanced content stream, as similarly discussed above.

In some embodiments, as shown in FIG. 9, content provider 701 may modify the manner in which content is captured, based on receiving an event indication from modeling system 105. For example, as shown, modeling system 105 may detect and/or classify (at 902) a particular event (e.g., as similarly described above), and may output (at 904) an indication of the event to content provider 701. Content provider 701 may adjust (at 906) capture parameters based on receiving the indication of the event, such as by physically actuating a mounted camera (e.g., mounted on a track, a boom, an arm, etc.), changing zoom settings of a camera, changing an azimuth angle of a camera, physically displacing one or more microphones, etc. For example, content provider 701 may move, pan, tilt, etc. a camera to point at a portion of field 107 at which the particular event is occurring. Content provider 701 may capture (at 908) content using the adjusted capture parameters, which may result in an improved view of the event in real time or near-real time, thus enhancing the user experience of viewers viewing such content.

Figure 10:
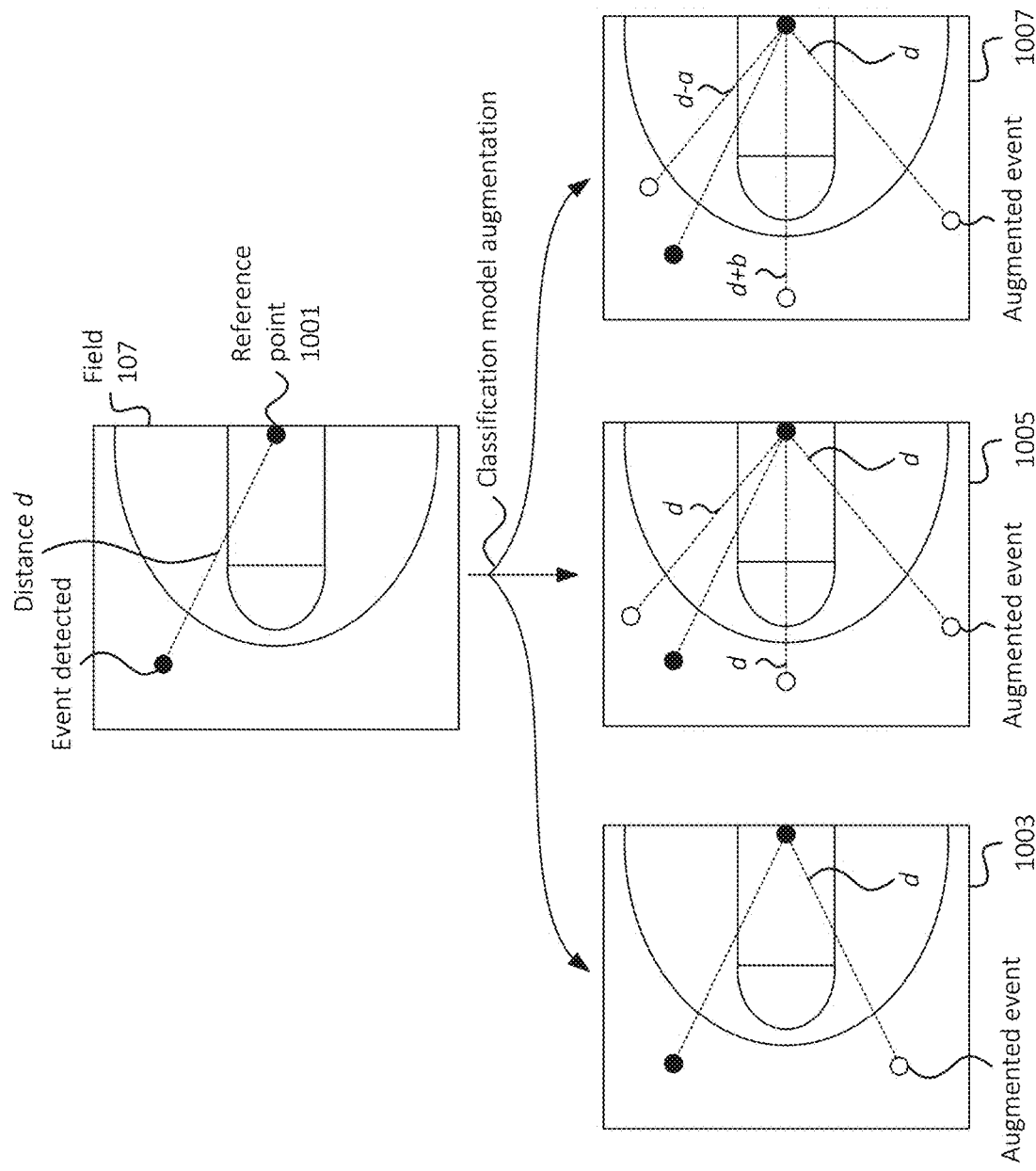
FIG. 10 illustrates an example of an augmentation of a classification model based on a detected event, in accordance with some embodiments.

In some embodiments, modeling system 105 may augment and/or modify one or more event models 305 based on detecting and/or classifying a particular event. For example, as shown in FIG. 10, an event may be detected within field 107, such as at a particular distance d from a particular reference point 1001 of field 107. In this example, reference point 1001 may be the position, within field 107, of a basket, goal, etc. of a sports game. Modeling system 105 may augment, modify, refine, etc. an event model 305 based on the position of the detected event with respect to reference point 1001 (e.g., based on distance d, an angle, etc.). Event model 305 may therefore be more likely, in the future, to predict the occurrence of the event at that same particular location.

As further shown, event model 305 may further be augmented based on the simulated occurrence of "augmented events," represented in the figure by white circles. For example, as shown in representation 1003, an augmented event may be simulated at the same distance d from reference point 1001, with an inverse angle as compared to the detected event (e.g., a "mirror image"). Additionally, or alternatively, as shown in representation 1005, multiple augmented events may be simulated at the same distance d and different angles (e.g., random or pseudorandom angles) in relation to reference point 1001. Additionally, or alternatively, as shown in representation 1007, multiple augmented events may be simulated at different distances (e.g., d−a, d+b, etc.) and different angles in relation to reference point 1001. In this manner, augmented event models 305 may have higher predictive ability based on the location of particular events in reference to reference point 1001. Such augmentation may be useful in situations where the same type of event may occur in locations that share similarities to detected events (e.g., the same or similar distance d from reference point 1001), but that may also be different from detected events (e.g., different angles with respect to reference point 1001).

Figure 11:
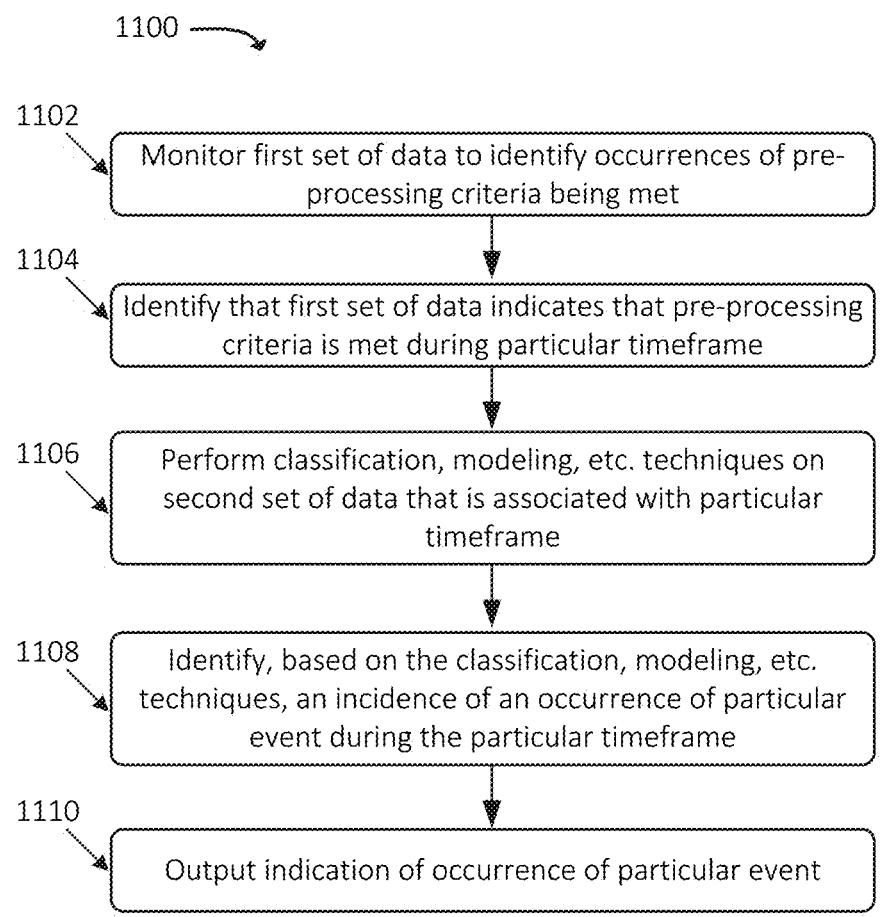
FIG. 11 illustrates an example process for pre-processing and modeling to detect an event, in accordance with some embodiments.

FIG. 11 illustrates an example process 1100 for pre-processing and modeling to detect an event, in accordance with some embodiments. In some embodiments, some or all of process 1100 may be performed by RCS 101. In some embodiments, one or more other devices may perform some or all of process 1100 in concert with, and/or in lieu of RCS 101. As noted above, in some embodiments, some functionality associated with RCS 101 (e.g., functionality associated with pre-processing system 103) may be performed by a first device or system, while other functionality of RCS 101 (e.g., functionality associated with modeling system 105) may be performed by a second device or system that is communicatively coupled to the first device or system via one or more networks.

As shown, process 1100 may include monitoring (at 1102) a first set of data to identify occurrences of pre-processing criteria being met. For example, as discussed above, RCS 101 (e.g., pre-processing system 103) may monitor position information or other suitable information to determine whether pre-processing criteria, associated with one or more different event types, is met by the position information. The monitoring may be performed on an ongoing basis, and may be based on rolling time windows, as discussed above.

Process 1100 may further include identifying (at 1104) that the first set of data indicates that pre-processing criteria, associated with a particular event type, is met during a particular timeframe. For example, as discussed above, the particular timeframe may be based on one or more rolling time windows during which the pre-processing criteria is met. In some embodiments, the particular timeframe may include an additional time offset at the beginning and/or end of the time windows during which the pre-processing criteria is met.

Process 1100 may additionally include performing (at 1106) a classification operation, a modeling operation, or the like on a second set of data that is associated with the particular timeframe. For example, RCS 101 (e.g., modeling system 105) may perform such classification, modeling, etc. techniques on a more complex or larger set of data than the first set of data, such as a set of streaming audio and/or video content. For example, the classification, modeling, etc. techniques may include AI/ML techniques, image and/or video recognition (e.g., "computer vision") techniques, or the likes based on which modeling system 105 may identify features, attributes, relationships, trends, etc. of the second set of data. In some embodiments, modeling system 105 may identify such features, attributes, etc., of the second set of data and compare such features, attributes, etc. to features, attributes, etc. of one or more event models 305. In some embodiments, modeling system 105 may compare such features, attributes, etc. of the second set of data to features, attributes, etc. of one or more other types of models. For example, modeling system 105 may identify that a particular player of a sports game depicted in video data is moving more quickly or in a different pattern than a model associated with the particular player (e.g., where such model may be based on historical movements of the player in past games).

In some embodiments, the classification and/or modeling techniques (e.g., at 1106) may be more resource-intensive than the pre-processing operations (e.g., at 1102). As discussed above, modeling system 105 may forgo performing such operations on the second set of data during times that do not correspond to a timeframe during which pre-processing criteria was met, thus conserving such resources. Additionally, or alternatively, modeling system 105 may not receive data to perform such operations on during such other times, which may conserve network resources that would be consumed in providing such data to modeling system 105.

Process 1100 may also include identifying (at 1108), based on the classification, modeling, etc. techniques, an incidence of an occurrence of a particular event during the particular timeframe. For example, as discussed above, modeling system 105 may evaluate the second data (and, in some embodiments, the first data) against one or more event models, to identify whether the evaluated data indicates an incidence of occurrence of a corresponding event.

Process 1100 may further include outputting (at 1110) an indication of the occurrence of the particular event. For example, modeling system 105 may output an indication of the occurrence of the particular event, which may include indicating an event type, times at which the event was detected, and/or other information determined by modeling system 105 (e.g., which may be independent of the event, such as features, attributes, etc. determined by modeling system 105 during the classification, modeling, etc. of the second set of data). As discussed above, an enhanced content stream may be generated indicating the occurrence of the event, attributes one or more audio and/or video capture systems may be modified based on the event, etc. Such operations may be performed in a manner that provides a real time or near-real time experience to viewers of the content, who may access the enhanced content within a relatively short period (e.g., within milliseconds or seconds) of the occurrence of the event.

Figure 12:
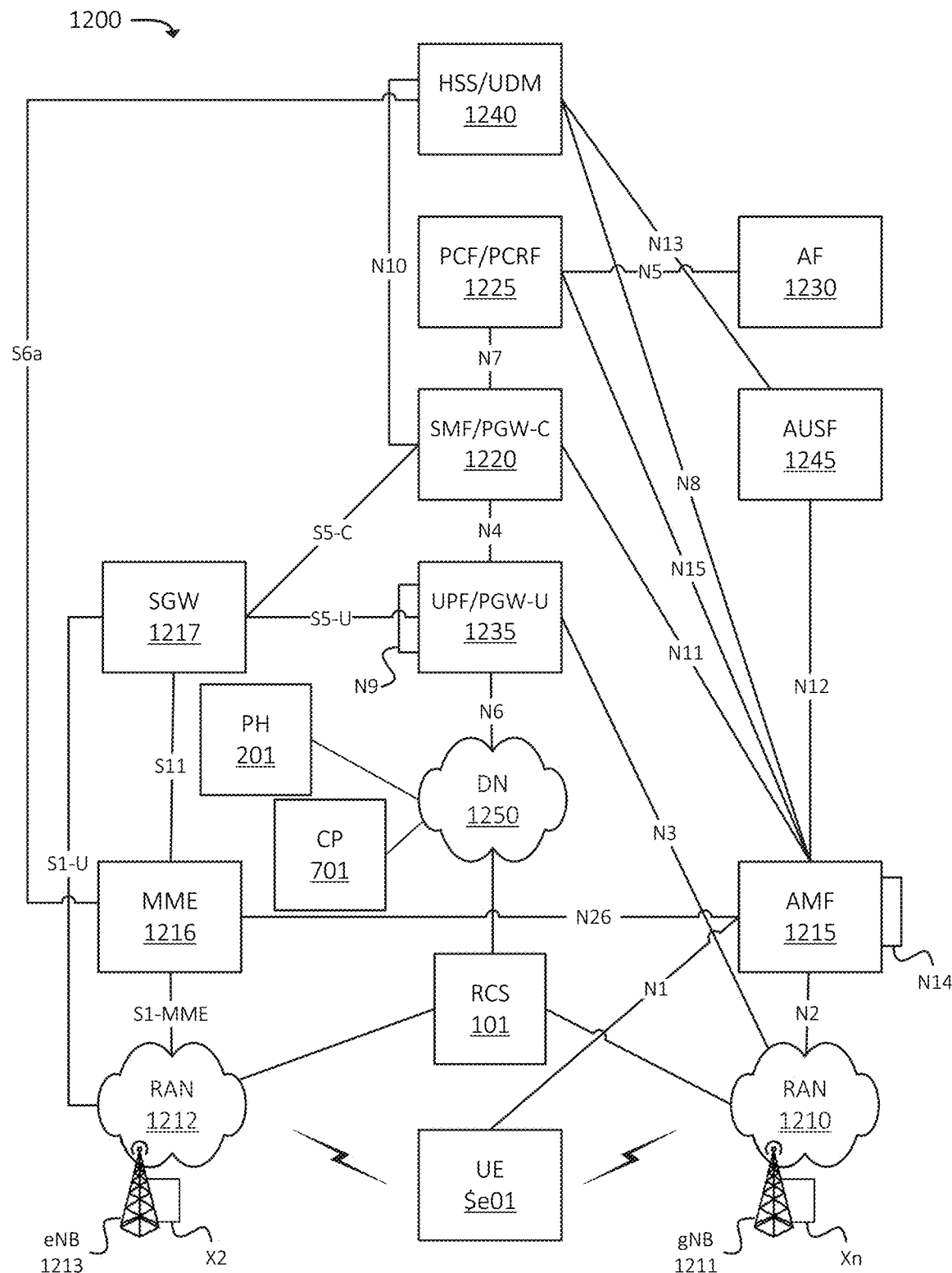
FIG. 12 illustrates an example environment in which one or more embodiments, described herein, may be implemented.

FIG. 12 illustrates an example environment 1200, in which one or more embodiments may be implemented. In some embodiments, environment 1200 may correspond to a 5G network, and/or may include elements of a 5G network. In some embodiments, environment 1200 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 1200 may include UE 1201, RAN 1210 (which may include one or more Next Generation Node Bs ("gNBs") 1211), RAN 1212 (which may include one or more evolved Node Bs ("eNBs") 1213), and various network functions such as Access and Mobility Management Function ("AMF") 1215, Mobility Management Entity ("MME") 1216, Serving Gateway ("SGW") 1217, Session Management Function ("SMF")/Packet Data Network ("PDN") Gateway ("PGW")-Control plane function ("PGW-C") 1220, Policy Control Function ("PCF")/Policy Charging and Rules Function ("PCRF") 1225, Application Function ("AF") 1230, User Plane Function ("UPF")/PGW-User plane function ("PGW-U") 1235, Home Subscriber Server ("HSS")/Unified Data Management ("UDM") 1240, and Authentication Server Function ("AUSF") 1245. Environment 1200 may also include one or more networks, such as Data Network ("DN") 1250. Environment 1200 may include one or more additional devices or systems communicatively coupled to one or more networks (e.g., DN 1250), such as RCS 101, premises hardware 201, and/or content provider 701. In some embodiments, some or all elements of environment 1200 may be associated with, may be included in, may implement, etc., some or all of network 207.

The example shown in FIG. 12 illustrates one instance of each network component or function (e.g., one instance of SMF/PGW-C 1220, PCF/PCRF 1225, UPF/PGW-U 1235, HSS/UDM 1240, and/or AUSF 1245). In practice, environment 1200 may include multiple instances of such components or functions. For example, in some embodiments, environment 1200 may include multiple "slices" of a core network, where each slice includes a discrete set of network functions (e.g., one slice may include a first instance of SMF/PGW-C 1220, PCF/PCRF 1225, UPF/PGW-U 1235, HSS/UDM 1240, and/or AUSF 1245, while another slice may include a second instance of SMF/PGW-C 1220, PCF/PCRF 1225, UPF/PGW-U 1235, HSS/UDM 1240, and/or AUSF 1245). The different slices may provide differentiated levels of service, such as service in accordance with different Quality of Service ("QoS") parameters.

The quantity of devices and/or networks, illustrated in FIG. 12, is provided for explanatory purposes only. In practice, environment 1200 may include additional devices and/or networks, fewer devices and/or networks, different devices and/or networks, or differently arranged devices and/or networks than illustrated in FIG. 12. For example, while not shown, environment 1200 may include devices that facilitate or enable communication between various components shown in environment 1200, such as routers, modems, gateways, switches, hubs, etc. Alternatively, or additionally, one or more of the devices of environment 1200 may perform one or more network functions described as being performed by another one or more of the devices of environment 1200. Devices of environment 1200 may interconnect with each other and/or other devices via wired connections, wireless connections, or a combination of wired and wireless connections. In some implementations, one or more devices of environment 1200 may be physically integrated in, and/or may be physically attached to, one or more other devices of environment 1200.

UE 1201 may include a computation and communication device, such as a wireless mobile communication device that is capable of communicating with RAN 1210, RAN 1212, and/or DN 1250. UE 1201 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 1201 may send traffic to and/or receive traffic (e.g., user plane traffic) from DN 1250 via RAN 1210, RAN 1212, and/or UPF/PGW-U 1235.

RAN 1210 may be, or may include, a 5G RAN that includes one or more base stations (e.g., one or more gNBs 1211), via which UE 1201 may communicate with one or more other elements of environment 1200. UE 1201 may communicate with RAN 1210 via an air interface (e.g., as provided by gNB 1211). For instance, RAN 1210 may receive traffic (e.g., voice call traffic, data traffic, messaging traffic, signaling traffic, etc.) from UE 1201 via the air interface, and may communicate the traffic to UPF/PGW-U 1235, and/or one or more other devices or networks. Similarly, RAN 1210 may receive traffic intended for UE 1201 (e.g., from UPF/PGW-U 1235, AMF 1215, and/or one or more other devices or networks) and may communicate the traffic to UE 1201 via the air interface.

RAN 1212 may be, or may include, a LTE RAN that includes one or more base stations (e.g., one or more eNBs 1213), via which UE 1201 may communicate with one or more other elements of environment 1200. UE 1201 may communicate with RAN 1212 via an air interface (e.g., as provided by eNB 1213). For instance, RAN 1210 may receive traffic (e.g., voice call traffic, data traffic, messaging traffic, signaling traffic, etc.) from UE 1201 via the air interface, and may communicate the traffic to UPF/PGW-U 1235, and/or one or more other devices or networks. Similarly, RAN 1210 may receive traffic intended for UE 1201 (e.g., from UPF/PGW-U 1235, SGW 1217, and/or one or more other devices or networks) and may communicate the traffic to UE 1201 via the air interface.

AMF 1215 may include one or more devices, systems, Virtualized Network Functions ("VNFs"), Cloud-Native Network Functions ("CNFs"), etc., that perform operations to register UE 1201 with the 5G network, to establish bearer channels associated with a session with UE 1201, to hand off UE 1201 from the 5G network to another network, to hand off UE 1201 from the other network to the 5G network, manage mobility of UE 1201 between RANs 1210 and/or gNBs 1211, and/or to perform other operations. In some embodiments, the 5G network may include multiple AMFs 1215, which communicate with each other via the N14 interface (denoted in FIG. 12 by the line marked "N14" originating and terminating at AMF 1215).

MME 1216 may include one or more devices, systems, VNFs, CNFs, etc., that perform operations to register UE 1201 with the EPC, to establish bearer channels associated with a session with UE 1201, to hand off UE 1201 from the EPC to another network, to hand off UE 1201 from another network to the EPC, manage mobility of UE 1201 between RANs 1212 and/or eNBs 1213, and/or to perform other operations.

SGW 1217 may include one or more devices, systems, VNFs, CNFs, etc., that aggregate traffic received from one or more eNBs 1213 and send the aggregated traffic to an external network or device via UPF/PGW-U 1235. Additionally, SGW 1217 may aggregate traffic received from one or more UPF/PGW-Us 1235 and may send the aggregated traffic to one or more eNBs 1213. SGW 1217 may operate as an anchor for the user plane during inter-eNB handovers and as an anchor for mobility between different telecommunication networks or RANs (e.g., RANs 1210 and 1212).

SMF/PGW-C 1220 may include one or more devices, systems, VNFs, CNFs, etc., that gather, process, store, and/or provide information in a manner described herein. SMF/PGW-C 1220 may, for example, facilitate the establishment of communication sessions on behalf of UE 1201. In some embodiments, the establishment of communications sessions may be performed in accordance with one or more policies provided by PCF/PCRF 1225.

PCF/PCRF 1225 may include one or more devices, systems, VNFs, CNFs, etc., that aggregate information to and from the 5G network and/or other sources. PCF/PCRF 1225 may receive information regarding policies and/or subscriptions from one or more sources, such as subscriber databases and/or from one or more users (such as, for example, an administrator associated with PCF/PCRF 1225).

AF 1230 may include one or more devices, systems, VNFs, CNFs, etc., that receive, store, and/or provide information that may be used in determining parameters (e.g., quality of service parameters, charging parameters, or the like) for certain applications.

UPF/PGW-U 1235 may include one or more devices, systems, VNFs, CNFs, etc., that receive, store, and/or provide data (e.g., user plane data). For example, UPF/PGW-U 1235 may receive user plane data (e.g., voice call traffic, data traffic, etc.), destined for UE 1201, from DN 1250, and may forward the user plane data toward UE 1201 (e.g., via RAN 1210, SMF/PGW-C 1220, and/or one or more other devices). In some embodiments, multiple UPFs 1235 may be deployed (e.g., in different geographical locations), and the delivery of content to UE 1201 may be coordinated via the N9 interface (e.g., as denoted in FIG. 12 by the line marked "N9" originating and terminating at UPF/PGW-U 1235). Similarly, UPF/PGW-U 1235 may receive traffic from UE 1201 (e.g., via RAN 1210, SMF/PGW-C 1220, and/or one or more other devices), and may forward the traffic toward DN 1250. In some embodiments, UPF/PGW-U 1235 may communicate (e.g., via the N4 interface) with SMF/PGW-C 1220, regarding user plane data processed by UPF/PGW-U 1235.

HSS/UDM 1240 and AUSF 1245 may include one or more devices, systems, VNFs, CNFs, etc., that manage, update, and/or store, in one or more memory devices associated with AUSF 1245 and/or HSS/UDM 1240, profile information associated with a subscriber. AUSF 1245 and/or HSS/UDM 1240 may perform authentication, authorization, and/or accounting operations associated with the subscriber and/or a communication session with UE 1201.

DN 1250 may include one or more wired and/or wireless networks. For example, DN 1250 may include an Internet Protocol ("IP")-based PDN, a wide area network ("WAN") such as the Internet, a private enterprise network, and/or one or more other networks. UE 1201 may communicate, through DN 1250, with data servers, other UEs 1201, and/or to other servers or applications that are coupled to DN 1250. DN 1250 may be connected to one or more other networks, such as a public switched telephone network ("PSTN"), a public land mobile network ("PLMN"), and/or another network. DN 1250 may be connected to one or more devices, such as content providers, applications, web servers, and/or other devices, with which UE 1201 may communicate.

Figure 13:
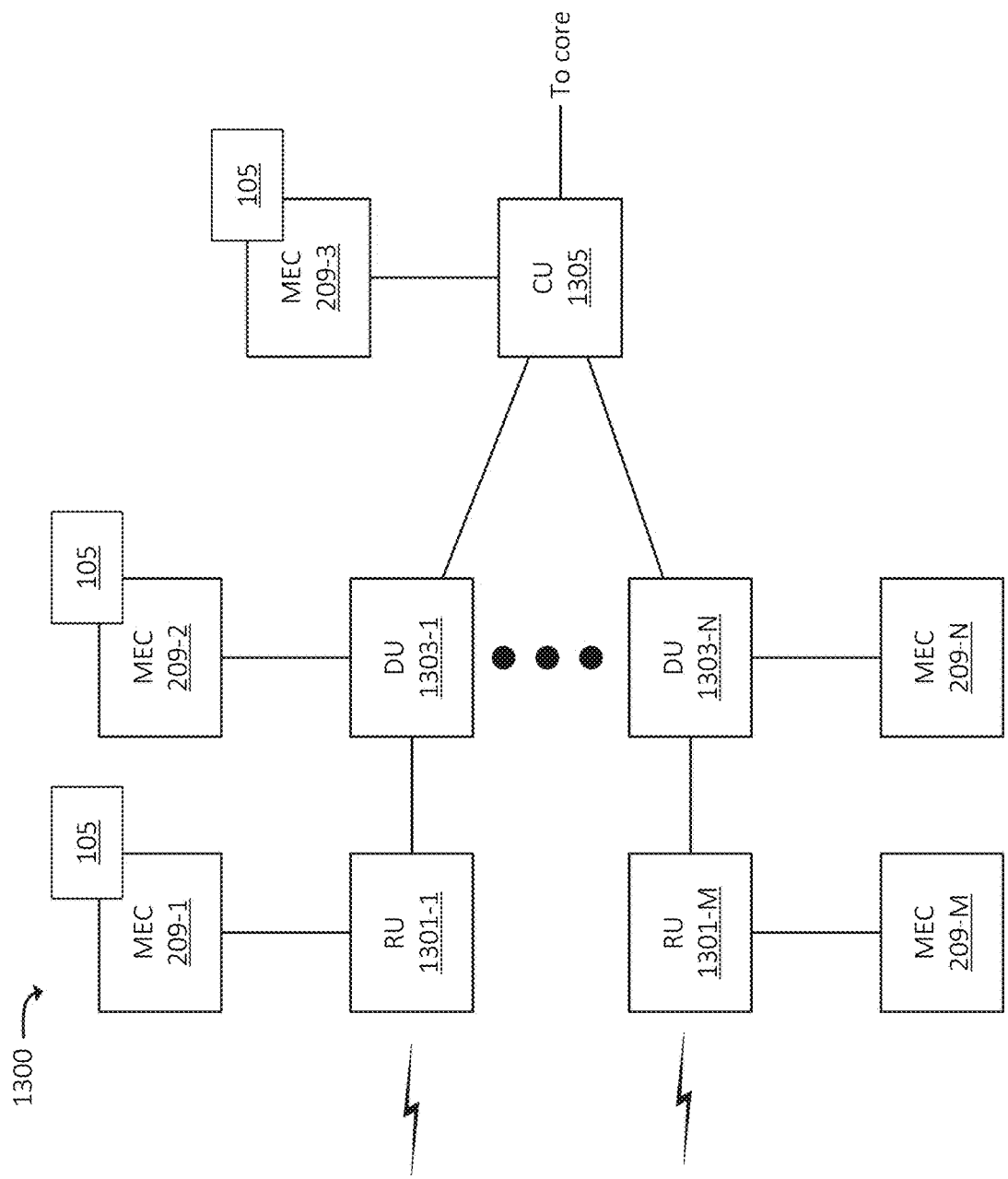
FIG. 13 illustrates an example arrangement of a radio access network ("RAN"), in accordance with some embodiments.

FIG. 13 illustrates an example Distributed Unit ("DU") network 1300, which may be included in and/or implemented by one or more RANs (e.g., RAN 1210, RAN 1212, or some other RAN). In some embodiments, a particular RAN may include one DU network 1300. In some embodiments, a particular RAN may include multiple DU networks 1300. In some embodiments, DU network 1300 may correspond to a particular gNB 1211 of a 5G RAN (e.g., RAN 1210). In some embodiments, DU network 1300 may correspond to multiple gNBs 1211. In some embodiments, DU network 1300 may correspond to one or more other types of base stations of one or more other types of RANs. As shown, DU network 1300 may include Central Unit ("CU") 1305, one or more Distributed Units ("DUs") 1303-1 through 1303-N (referred to individually as "DU 1303," or collectively as "DUs 1303"), and one or more Radio Units ("RUs") 1301-1 through 1301-M (referred to individually as "RU 1301," or collectively as "RUs 1301").

CU 1305 may communicate with a core of a wireless network (e.g., may communicate with one or more of the devices or systems described above with respect to FIG. 12, such as AMF 1215 and/or UPF/PGW-U 1235). In the uplink direction (e.g., for traffic from UEs 1201 to a core network), CU 1305 may aggregate traffic from DUs 1303, and forward the aggregated traffic to the core network. In some embodiments, CU 1305 may receive traffic according to a given protocol (e.g., Radio Link Control ("RLC")) from DUs 1303, and may perform higher-layer processing (e.g., may aggregate/process RLC packets and generate Packet Data Convergence Protocol ("PDCP") packets based on the RLC packets) on the traffic received from DUs 1303.

In accordance with some embodiments, CU 1305 may receive downlink traffic (e.g., traffic from the core network) for a particular UE 1201, and may determine which DU(s) 1303 should receive the downlink traffic. DU 1303 may include one or more devices that transmit traffic between a core network (e.g., via CU 1305) and UE 1201 (e.g., via a respective RU 1301). DU 1303 may, for example, receive traffic from RU 1301 at a first layer (e.g., physical ("PHY") layer traffic, or lower PHY layer traffic), and may process/aggregate the traffic to a second layer (e.g., upper PHY and/or RLC). DU 1303 may receive traffic from CU 1305 at the second layer, may process the traffic to the first layer, and provide the processed traffic to a respective RU 1301 for transmission to UE 1201.

RU 1301 may include hardware circuitry (e.g., one or more RF transceivers, antennas, radios, and/or other suitable hardware) to communicate wirelessly (e.g., via an RF interface) with one or more UEs 1201, one or more other DUs 1303 (e.g., via RUs 1301 associated with DUs 1303), and/or any other suitable type of device. In the uplink direction, RU 1301 may receive traffic from UE 1201 and/or another DU 1303 via the RF interface and may provide the traffic to DU 1303. In the downlink direction, RU 1301 may receive traffic from DU 1303, and may provide the traffic to UE 1201 and/or another DU 1303.

RUs 1301 may, in some embodiments, be communicatively coupled to one or more Multi-Access/Mobile Edge Computing ("MEC") devices, referred to sometimes herein simply as "MECs" 209. For example, RU 1301-1 may be communicatively coupled to MEC 209-1, RU 1301-M may be communicatively coupled to MEC 209-M, DU 1303-1 may be communicatively coupled to MEC 209-2, DU 1303-N may be communicatively coupled to MEC 209-N, CU 1305 may be communicatively coupled to MEC 209-3, and so on. MECs 209 may include hardware resources (e.g., configurable or provisionable hardware resources) that may be configured to provide services and/or otherwise process traffic to and/or from UE 1201, via a respective RU 1301.

For example, RU 1301-1 may route some traffic, from UE 1201, to MEC 209-1 instead of to a core network (e.g., via DU 1303 and CU 1305). MEC 209-1 may process the traffic, perform one or more computations based on the received traffic, and may provide traffic to UE 1201 via RU 1301-1. In this manner, ultra-low latency services may be provided to UE 1201, as traffic does not need to traverse DU 1303, CU 1305, and an intervening backhaul network between DU network 1300 and the core network. In some embodiments, MEC 209 may include, and/or may implement, some or all of the functionality described above with respect to RCS 101 (e.g., one or both of pre-processing system 103 and/or modeling system 105), UPF 1235, and/or one or more other devices, systems, VNFs, CNFs, etc. For example, as discussed above, in some embodiments, pre-processing system 103 may be implemented by premises hardware 201, and modeling system 105 may be implemented by one or more MECs 209.

Figure 14:
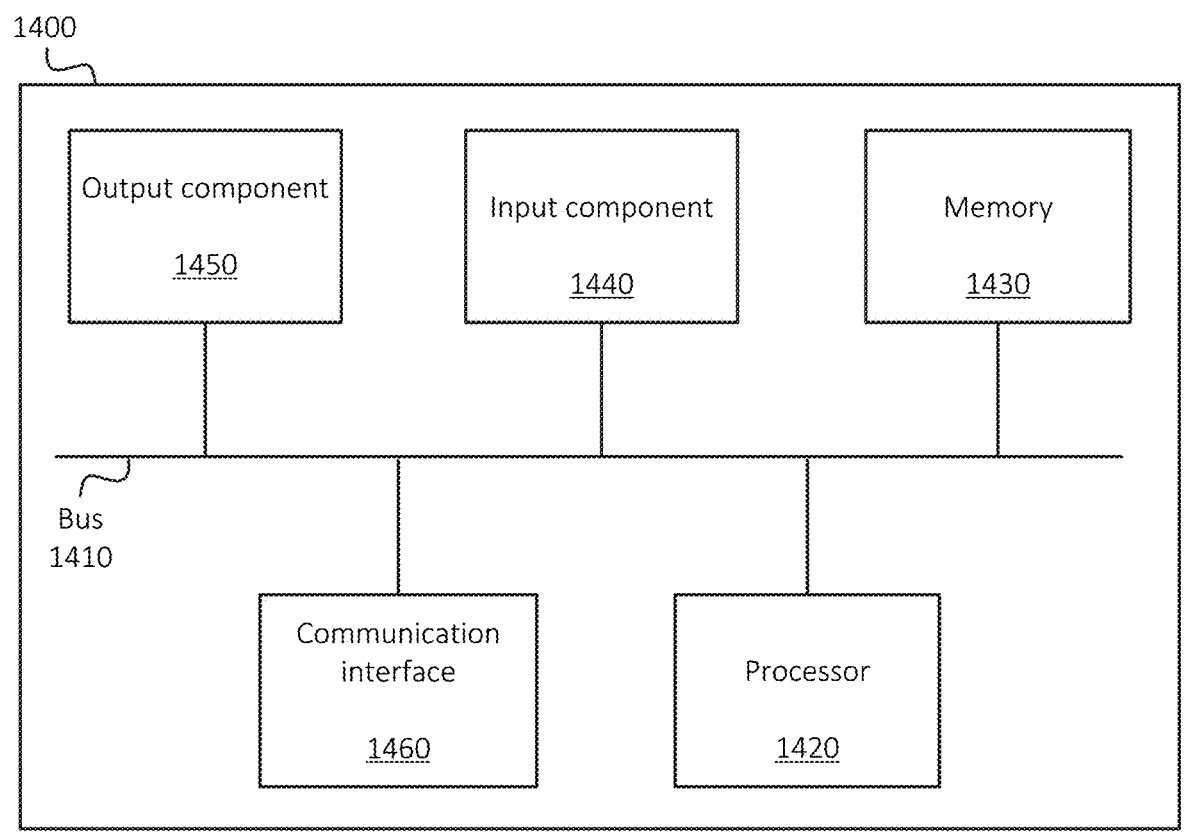
FIG. 14 illustrates example components of one or more devices, in accordance with one or more embodiments described herein.

FIG. 14 illustrates example components of device 1400. One or more of the devices described above may include one or more devices 1400. Device 1400 may include bus 1410, processor 1420, memory 1430, input component 1440, output component 1450, and communication interface 1460. In another implementation, device 1400 may include additional, fewer, different, or differently arranged components.

Bus 1410 may include one or more communication paths that permit communication among the components of device 1400. Processor 1420 may include a processor, microprocessor, or processing logic that may interpret and execute instructions. In some embodiments, processor 1420 may be or may include one or more hardware processors. Memory 1430 may include any type of dynamic storage device that may store information and instructions for execution by processor 1420, and/or any type of non-volatile storage device that may store information for use by processor 1420.

Input component 1440 may include a mechanism that permits an operator to input information to device 1400 and/or other receives or detects input from a source external to 1440, such as a touchpad, a touchscreen, a keyboard, a keypad, a button, a switch, a microphone or other audio input component, etc. In some embodiments, input component 1440 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1450 may include a mechanism that outputs information to the operator, such as a display, a speaker, one or more light emitting diodes ("LEDs"), etc.

Communication interface 1460 may include any transceiver-like mechanism that enables device 1400 to communicate with other devices and/or systems. For example, communication interface 1460 may include an Ethernet interface, an optical interface, a coaxial interface, or the like. Communication interface 1460 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1400 may include more than one communication interface 1460. For instance, device 1400 may include an optical interface and an Ethernet interface.

Device 1400 may perform certain operations relating to one or more processes described above. Device 1400 may perform these operations in response to processor 1420 executing software instructions stored in a computer-readable medium, such as memory 1430. A computer-readable medium may be defined as a non-transitory memory device. A memory device may include space within a single physical memory device or spread across multiple physical memory devices. The software instructions may be read into memory 1430 from another computer-readable medium or from another device. The software instructions stored in memory 1430 may cause processor 1420 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1A-11), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
   monitor a first set of data to identify whether a particular set of criteria are met with respect to the first set of data, wherein the first set of data is associated with a first timeframe;
   identify, based on the monitoring, a second timeframe during which the particular set of criteria are met with respect to the first set of data, wherein the second timeframe is a subset of the first timeframe;
   provide an indication, to a content provider that maintains a second set of data, of the identified second timeframe,
   wherein the content provider identifies a subset of the second set of data, wherein the subset of the second set of data is associated with the identified second timeframe, and
   wherein the content provider outputs, based on the indication, the identified subset of the second set of data;
   receive the subset of the second set of data that is outputted by the content provider;
   perform one or more modeling techniques on the subset of the second set of data, associated with the identified particular timeframe, to identify an occurrence of a particular event during the second timeframe;
   identify, based on performing the one or more modeling techniques on the second set of data, the occurrence of the particular event during the second timeframe; and
   output an indication of the identified particular event occurring during the second timeframe.

2. The device of claim 1, wherein the second set of data includes data that is not included in the first set of data.

3. The device of claim 2, wherein the first set of data includes monitored position information of one or more objects in a field, and wherein the second set of data includes captured video data depicting at least one of the one or more objects in the field.

4. The device of claim 3, wherein the position information is based on position information provided by one or more positional sensors.

5. The device of claim 1, wherein the one or more processors are further configured to:
   forgo performing the one or more modeling techniques on portions of the second set of data, that is associated with times other than the subset of the second set of data that is associated with the identified second timeframe.

6. The device of claim 1, wherein the second set of data includes captured content, wherein the content provider forgoes outputting captured content, associated with times other than the second timeframe, to the device.

7. The device of claim 1, wherein monitoring the first set of data consumes fewer processing resources than performing the one or more modeling techniques on the second set of data.

8. A non-transitory computer-readable medium, storing a plurality of processor-executable instructions to:
   monitor a first set of data to identify whether a particular set of criteria are met with respect to the first set of data, wherein the first set of data is associated with a first timeframe;

identify, based on the monitoring, a second timeframe during which the particular set of criteria are met with respect to the first set of data, wherein the second timeframe is a subset of the first timeframe;

provide an indication, to a content provider that maintains a second set of data, of the identified second timeframe,
- wherein the content provider identifies a subset of the second set of data, wherein the subset of the second set of data is associated with the identified second timeframe, and
- wherein the content provider outputs, based on the indication, the identified subset of the second set of data;

receive the subset of the second set of data that is outputted by the content provider;

perform one or more modeling techniques on the subset of the second set of data, associated with the identified particular timeframe, to identify an occurrence of a particular event during the second timeframe;

identify, based on performing the one or more modeling techniques on the second set of data, the occurrence of the particular event during the second timeframe; and output an indication of the identified particular event occurring during the second timeframe.

9. The non-transitory computer-readable medium of claim 8, wherein the second set of data includes data that is not included in the first set of data.

10. The non-transitory computer-readable medium of claim 9, wherein the first set of data includes monitored position information of one or more objects in a field, and wherein the second set of data includes captured video data depicting at least one of the one or more objects in the field.

11. The non-transitory computer-readable medium of claim 10, wherein the position information is based on position information provided by one or more positional sensors.

12. The non-transitory computer-readable medium of claim 8, wherein the plurality of processor-executable instructions further include processor-executable instructions to:
- forgo performing the one or more modeling techniques on portions of the second set of data, that is associated with times other than the subset of the second set of data that is associated with the identified second timeframe.

13. The non-transitory computer-readable medium of claim 8, wherein the second set of data includes captured content, wherein the content provider forgoes outputting captured content, associated with times other than the second timeframe.

14. The non-transitory computer-readable medium of claim 8, wherein monitoring the first set of data consumes fewer processing resources than performing the one or more modeling techniques on the second set of data.

15. A method, comprising:

monitoring a first set of data to identify whether a particular set of criteria are met with respect to the first set of data, wherein the first set of data is associated with a first timeframe;

identifying, based on the monitoring, a second timeframe during which the particular set of criteria are met with respect to the first set of data, wherein the second timeframe is a subset of the first timeframe;

providing an indication, to a content provider that maintains a second set of data, of the identified second timeframe,
- wherein the content provider identifies a subset of the second set of data, wherein the subset of the second set of data is associated with the identified second timeframe, and
- wherein the content provider outputs, based on the indication, the identified subset of the second set of data;

receiving the subset of the second set of data that is outputted by the content provider;

performing one or more modeling techniques on the subset of the second set of data, associated with the identified particular timeframe, to identify an occurrence of a particular event during the second timeframe;

identifying, based on performing the one or more modeling techniques on the second set of data, the occurrence of the particular event during the second timeframe; and outputting an indication of the identified particular event occurring during the second timeframe.

16. The method of claim 15, wherein the first set of data includes monitored position information of one or more objects in a field, and wherein the second set of data includes captured video data depicting at least one of the one or more objects in the field.

17. The method of claim 16, wherein the position information is based on position information provided by one or more positional sensors.

18. The method of claim 15, further comprising:
- forgoing performing the one or more modeling techniques on the second set of data at times other than the particular timeframe.

19. The method of claim 15, wherein the second set of data includes captured content, wherein the content provider forgoes outputting captured content, associated with times other than the second timeframe.

20. The method of claim 15, wherein monitoring the first set of data consumes fewer processing resources than performing the one or more modeling techniques on the second set of data.

\* \* \* \* \*